(12) United States Patent
Vainstein et al.

(10) Patent No.: US 7,890,990 B1
(45) Date of Patent: Feb. 15, 2011

(54) SECURITY SYSTEM WITH STAGING CAPABILITIES

(76) Inventors: Klimenty Vainstein, 10526 N. Foothill Blvd., #A, Cupertino, CA (US) 95014; Michael Michio Ouye, 150 W. Edith Ave., #17, Los Altos, CA (US) 94061

( * ) Notice: Subject to any disclaimer, the term of this patent is extended or adjusted under 35 U.S.C. 154(b) by 1168 days.

(21) Appl. No.: 10/327,320

(22) Filed: Dec. 20, 2002

(51) Int. Cl.
*H04L 29/06* (2006.01)
(52) U.S. Cl. .......................................... 726/1; 717/176
(58) Field of Classification Search ........................ None
See application file for complete search history.

(56) References Cited

U.S. PATENT DOCUMENTS

| | | | |
|---|---|---|---|
| 4,203,166 | A | 5/1980 | Eshram et al. |
| 4,734,568 | A | 3/1988 | Watanabe |
| 4,757,533 | A | 7/1988 | Allen et al. |
| 4,796,220 | A | 1/1989 | Wolfe |
| 4,799,258 | A | 1/1989 | Davies |
| 4,827,508 | A | 5/1989 | Shear |
| 4,888,800 | A | 12/1989 | Marshall et al. |
| 4,972,472 | A | 11/1990 | Brown et al. |
| 5,032,979 | A | 7/1991 | Hecht et al. |
| 5,052,040 | A | 9/1991 | Preston et al. |
| 5,058,164 | A | 10/1991 | Elmer et al. |
| 5,144,660 | A | 9/1992 | Rose |
| 5,204,897 | A | 4/1993 | Wyman |
| 5,220,657 | A | 6/1993 | Bly et al. |
| 5,235,641 | A | 8/1993 | Nozawa et al. |
| 5,247,575 | A | 9/1993 | Sprague et al. |
| 5,276,735 | A | 1/1994 | Boebert et al. |
| 5,301,247 | A | 4/1994 | Rasmussen et al. |
| 5,319,705 | A | 6/1994 | Halter et al. |
| 5,369,702 | A | 11/1994 | Shanton |
| 5,375,169 | A | 12/1994 | Seheidt et al. |
| 5,404,404 | A | 4/1995 | Novorita |
| 5,406,628 | A | 4/1995 | Beller et al. |
| 5,414,852 | A | 5/1995 | Kramer et al. |
| 5,495,533 | A | 2/1996 | Linehan et al. |
| 5,499,297 | A | 3/1996 | Boebert |
| 5,502,766 | A | 3/1996 | Boebert et al. |

(Continued)

FOREIGN PATENT DOCUMENTS

EP  0 672 991 A2  9/1995

(Continued)

OTHER PUBLICATIONS

Microsoft Press Computer Dictionary, 1997, Microsoft Press, Third Edition, p. 426.*

(Continued)

*Primary Examiner*—David J Pearson
(74) *Attorney, Agent, or Firm*—Sterne, Kessler, Goldstein & Fox P.L.L.C.

(57) ABSTRACT

An improved system and method for providing a security system with the capability to stage a modification to its operation is disclosed. Staging the modification before actually modifying normal operation of the security system allows the impact of the modification on the security system to be examined prior to deployment. If the staging of the modification to the security system is deemed successful, the modification can be fully deployed with reduced risk of unexpected security lapses or other detrimental consequences.

30 Claims, 9 Drawing Sheets

U.S. PATENT DOCUMENTS

| | | | |
|---|---|---|---|
| 5,535,375 A | 7/1996 | Eshel et al. |
| 5,557,765 A | 9/1996 | Lipner et al. |
| 5,570,108 A | 10/1996 | McLaughlin et al. |
| 5,584,023 A | 12/1996 | Hsu |
| 5,600,722 A | 2/1997 | Yamaguchi et al. |
| 5,606,663 A | 2/1997 | Kadooka |
| 5,655,119 A | 8/1997 | Davy |
| 5,661,806 A | 8/1997 | Nevoux et al. |
| 5,671,412 A | 9/1997 | Christiano |
| 5,673,316 A | 9/1997 | Auerbach et al. |
| 5,677,953 A | 10/1997 | Dolphin |
| 5,680,452 A | 10/1997 | Shanton |
| 5,684,987 A | 11/1997 | Mamiya et al. |
| 5,689,718 A | 11/1997 | Sakurai et al. |
| 5,699,428 A | 12/1997 | McDonnal et al. |
| 5,708,709 A | 1/1998 | Rose |
| 5,715,403 A | 2/1998 | Stefik |
| 5,717,755 A | 2/1998 | Shanton |
| 5,720,033 A | 2/1998 | Deo |
| 5,729,734 A | 3/1998 | Parker et al. |
| 5,732,265 A | 3/1998 | Dewitt et al. |
| 5,745,573 A | 4/1998 | Lipner et al. |
| 5,748,736 A | 5/1998 | Mittra |
| 5,751,287 A | 5/1998 | Hahn et al. |
| 5,757,920 A | 5/1998 | Misra et al. |
| 5,765,152 A | 6/1998 | Ericson |
| 5,778,065 A | 7/1998 | Hauser et al. |
| 5,787,169 A | 7/1998 | Eldridge et al. |
| 5,787,173 A | 7/1998 | Seheidt et al. |
| 5,787,175 A | 7/1998 | Carter |
| 5,790,789 A | 8/1998 | Suarez |
| 5,790,790 A | 8/1998 | Smith et al. |
| 5,813,009 A | 9/1998 | Johnson et al. |
| 5,821,933 A | 10/1998 | Keller et al. |
| 5,825,876 A | 10/1998 | Peterson |
| 5,835,592 A | 11/1998 | Chang et al. |
| 5,835,601 A | 11/1998 | Shimbo et al. |
| 5,857,189 A | 1/1999 | Riddle |
| 5,862,325 A | 1/1999 | Reed et al. |
| 5,870,468 A | 2/1999 | Harrison |
| 5,870,477 A | 2/1999 | Sasaki et al. |
| 5,881,287 A | 3/1999 | Mast |
| 5,892,900 A | 4/1999 | Ginter et al. |
| 5,893,084 A | 4/1999 | Morgan et al. |
| 5,898,781 A | 4/1999 | Shanton |
| 5,922,073 A | 7/1999 | Shimada |
| 5,923,754 A | 7/1999 | Angelo et al. |
| 5,933,498 A | 8/1999 | Schneck et al. |
| 5,944,794 A | 8/1999 | Okamoto et al. |
| 5,953,419 A | 9/1999 | Lohstroh et al. |
| 5,968,177 A | 10/1999 | Batten-Carew et al. |
| 5,970,502 A | 10/1999 | Salkewicz et al. |
| 5,987,440 A | 11/1999 | O'Neil et al. |
| 5,991,879 A | 11/1999 | Still |
| 5,999,907 A | 12/1999 | Donner |
| 6,014,730 A | 1/2000 | Ohtsu |
| 6,023,506 A | 2/2000 | Ote et al. |
| 6,032,216 A | 2/2000 | Schmuck et al. |
| 6,038,322 A | 3/2000 | Harkins |
| 6,044,155 A | 3/2000 | Thomlinson et al. |
| 6,055,314 A | 4/2000 | Spies et al. |
| 6,058,424 A | 5/2000 | Dixon et al. |
| 6,061,790 A | 5/2000 | Bodnar |
| 6,069,957 A | 5/2000 | Richards |
| 6,085,323 A | 7/2000 | Shimizu et al. |
| 6,088,717 A | 7/2000 | Reed et al. |
| 6,088,805 A | 7/2000 | Davis et al. |
| 6,098,056 A | 8/2000 | Rusnak et al. |
| 6,101,507 A | 8/2000 | Cane et al. |
| 6,105,131 A | 8/2000 | Carroll |
| 6,122,630 A | 9/2000 | Strickler et al. |
| 6,134,327 A | 10/2000 | Van Oorschot |
| 6,134,658 A | 10/2000 | Multerer et al. |
| 6,134,660 A | 10/2000 | Boneh et al. |
| 6,134,664 A | 10/2000 | Walker |
| 6,141,754 A | 10/2000 | Choy |
| 6,145,084 A | 11/2000 | Zuili |
| 6,158,010 A * | 12/2000 | Moriconi et al. ............... 726/1 |
| 6,161,139 A | 12/2000 | Win et al. |
| 6,182,142 B1 | 1/2001 | Win et al. |
| 6,185,684 B1 | 2/2001 | Pravetz et al. |
| 6,205,549 B1 | 3/2001 | Pravetz et al. |
| 6,212,561 B1 | 4/2001 | Sitaraman et al. |
| 6,223,285 B1 | 4/2001 | Komuro et al. |
| 6,226,618 B1 | 5/2001 | Downs et al. |
| 6,226,745 B1 | 5/2001 | Wiederhold et al. |
| 6,240,188 B1 | 5/2001 | Dondeti et al. |
| 6,249,873 B1 | 6/2001 | Richard et al. |
| 6,253,193 B1 | 6/2001 | Ginter et al. |
| 6,260,040 B1 | 7/2001 | Kauffman et al. |
| 6,260,141 B1 | 7/2001 | Park |
| 6,263,348 B1 | 7/2001 | Kathrow et al. |
| 6,272,631 B1 | 8/2001 | Thomlinson et al. |
| 6,272,632 B1 | 8/2001 | Carmen et al. |
| 6,282,649 B1 | 8/2001 | Lambert et al. |
| 6,289,450 B1 | 9/2001 | Pensak et al. |
| 6,292,895 B1 | 9/2001 | Baltzley |
| 6,292,899 B1 | 9/2001 | McBride |
| 6,295,361 B1 | 9/2001 | Kadansky et al. |
| 6,301,614 B1 | 10/2001 | Najork et al. |
| 6,308,256 B1 | 10/2001 | Folmsbee |
| 6,308,273 B1 | 10/2001 | Goertzel et al. |
| 6,314,409 B2 | 11/2001 | Schneck et al. |
| 6,317,777 B1 | 11/2001 | Skarbo et al. |
| 6,332,025 B2 | 12/2001 | Takahashi et al. |
| 6,336,114 B1 | 1/2002 | Garrison |
| 6,339,423 B1 | 1/2002 | Sampson et al. |
| 6,339,825 B2 | 1/2002 | Pensak et al. |
| 6,341,164 B1 | 1/2002 | Dilkie et al. |
| 6,343,316 B1 | 1/2002 | Sakata |
| 6,347,374 B1 | 2/2002 | Drake et al. |
| 6,349,337 B1 | 2/2002 | Parsons et al. |
| 6,351,813 B1 | 2/2002 | Mooney et al. |
| 6,356,903 B1 | 3/2002 | Baxter et al. |
| 6,356,941 B1 | 3/2002 | Cohen |
| 6,357,010 B1 | 3/2002 | Viets et al. |
| 6,363,480 B1 | 3/2002 | Perlman |
| 6,370,249 B1 | 4/2002 | Van Oorschot |
| 6,381,698 B1 | 4/2002 | Devanbu et al. |
| 6,389,433 B1 | 5/2002 | Bolosky et al. |
| 6,389,538 B1 | 5/2002 | Gruse et al. |
| 6,393,420 B1 | 5/2002 | Peters |
| 6,405,315 B1 | 6/2002 | Burns et al. |
| 6,421,714 B1 | 7/2002 | Rai et al. |
| 6,442,688 B1 | 8/2002 | Moses et al. |
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,466,932 B1 | 10/2002 | Dennis et al. |
| 6,477,544 B1 | 11/2002 | Bolosky et al. |
| 6,490,680 B1 | 12/2002 | Scheidt et al. |
| 6,505,300 B2 | 1/2003 | Chan et al. |
| 6,510,349 B1 | 1/2003 | Schneck et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 | 4/2003 | Sims |
| 6,557,039 B1 | 4/2003 | Leong et al. |
| 6,567,914 B1 | 5/2003 | Just et al. |
| 6,571,291 B1 | 5/2003 | Chow |
| 6,584,466 B1 | 6/2003 | Serbinis et al. |

| Patent No. | Date | Inventor(s) |
|---|---|---|
| 6,587,946 B1 | 7/2003 | Jakobsson |
| 6,588,673 B1 | 7/2003 | Chan et al. |
| 6,594,662 B1 | 7/2003 | Sieffert et al. |
| 6,598,161 B1 | 7/2003 | Kluttz et al. |
| 6,603,857 B1 | 8/2003 | Batten-Carew et al. |
| 6,608,636 B1 | 8/2003 | Roseman |
| 6,611,599 B2 | 8/2003 | Natarajan |
| 6,615,349 B1 | 9/2003 | Hair |
| 6,615,350 B1 | 9/2003 | Schell et al. |
| 6,625,650 B2 | 9/2003 | Stelliga |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,687,822 B1 | 2/2004 | Jakobsson |
| 6,711,683 B1 | 3/2004 | Laczko et al. |
| 6,718,361 B1 * | 4/2004 | Basani et al. ............... 709/201 |
| 6,735,701 B1 | 5/2004 | Jacobson |
| 6,738,908 B1 | 5/2004 | Bonn et al. |
| 6,775,779 B1 | 8/2004 | England et al. |
| 6,782,403 B1 | 8/2004 | Kino et al. |
| 6,801,999 B1 | 10/2004 | Venkatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,826,698 B1 * | 11/2004 | Minkin et al. .................. 726/1 |
| 6,834,333 B2 | 12/2004 | Yoshino et al. |
| 6,834,341 B1 | 12/2004 | Bahl et al. |
| 6,845,452 B1 | 1/2005 | Roddy et al. |
| 6,851,050 B2 | 2/2005 | Singhal et al. |
| 6,865,555 B2 | 3/2005 | Novak |
| 6,874,139 B2 | 3/2005 | Krueger et al. |
| 6,877,136 B2 | 4/2005 | Bess et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,907,034 B1 | 6/2005 | Begis |
| 6,909,708 B1 | 6/2005 | Krishnaswamy et al. |
| 6,915,434 B1 | 7/2005 | Kuroda et al. |
| 6,920,558 B2 | 7/2005 | Sames et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 | 9/2005 | Matyas, Jr. et al. |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,780 B2 | 10/2005 | Olsen et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,968,060 B1 | 11/2005 | Pinkas |
| 6,971,018 B1 | 11/2005 | Witt et al. |
| 6,978,376 B2 | 12/2005 | Giroux et al. |
| 6,978,377 B1 | 12/2005 | Asano et al. |
| 6,988,133 B1 * | 1/2006 | Zavalkovsky et al. ....... 709/223 |
| 6,988,199 B2 | 1/2006 | Toh et al. |
| 6,993,135 B2 | 1/2006 | Ishibashi |
| 6,996,718 B1 | 2/2006 | Henry et al. |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,046,807 B2 | 5/2006 | Hirano et al. |
| 7,051,213 B1 | 5/2006 | Kobayashi et al. |
| 7,058,696 B1 | 6/2006 | Phillips et al. |
| 7,058,978 B2 | 6/2006 | Feuerstein et al. |
| 7,073,063 B2 | 7/2006 | Peinado |
| 7,073,073 B1 | 7/2006 | Nonaka et al. |
| 7,076,067 B2 | 7/2006 | Raike et al. |
| 7,076,312 B2 | 7/2006 | Law et al. |
| 7,076,469 B2 | 7/2006 | Schreiber et al. |
| 7,076,633 B2 | 7/2006 | Tormasov et al. |
| 7,080,077 B2 | 7/2006 | Ramamurthy et al. |
| 7,095,853 B2 | 8/2006 | Morishita |
| 7,096,266 B2 | 8/2006 | Lewin et al. |
| 7,099,926 B1 | 8/2006 | Ims et al. |
| 7,107,269 B2 | 9/2006 | Arlein et al. |
| 7,120,635 B2 | 10/2006 | Bhide et al. |
| 7,120,757 B2 | 10/2006 | Tsuge |
| 7,124,164 B1 | 10/2006 | Chemtob |
| 7,130,964 B2 | 10/2006 | Ims et al. |
| 7,131,071 B2 | 10/2006 | Gune et al. |
| 7,134,041 B2 | 11/2006 | Murray et al. |
| 7,136,903 B1 | 11/2006 | Phillips et al. |
| 7,145,898 B1 | 12/2006 | Elliott |
| 7,146,498 B1 | 12/2006 | Takechi et al. |
| 7,159,036 B2 | 1/2007 | Hinchliffe et al. |
| 7,171,557 B2 | 1/2007 | Kallahalla et al. |
| 7,174,563 B1 | 2/2007 | Brownlie et al. |
| 7,177,427 B1 | 2/2007 | Komuro et al. |
| 7,178,033 B1 | 2/2007 | Garcia |
| 7,181,017 B1 | 2/2007 | Nagel et al. |
| 7,185,364 B2 | 2/2007 | Knouse et al. |
| 7,187,033 B2 | 3/2007 | Pendharkar |
| 7,188,181 B1 | 3/2007 | Squier et al. |
| 7,194,764 B2 | 3/2007 | Martherus et al. |
| 7,200,747 B2 | 4/2007 | Riedel et al. |
| 7,203,317 B2 | 4/2007 | Kallahalla et al. |
| 7,203,968 B2 | 4/2007 | Asano et al. |
| 7,219,230 B2 | 5/2007 | Riedel et al. |
| 7,224,795 B2 | 5/2007 | Takada et al. |
| 7,225,256 B2 | 5/2007 | Villavicencio |
| 7,227,953 B2 | 6/2007 | Shida |
| 7,233,948 B1 | 6/2007 | Shamoon et al. |
| 7,237,002 B1 * | 6/2007 | Estrada et al. ............... 709/203 |
| 7,249,044 B2 | 7/2007 | Kumar et al. |
| 7,260,555 B2 | 8/2007 | Rossmann et al. |
| 7,265,764 B2 | 9/2007 | Alben et al. |
| 7,266,684 B2 | 9/2007 | Jancula |
| 7,280,658 B2 | 10/2007 | Amini et al. |
| 7,287,055 B2 | 10/2007 | Smith et al. |
| 7,290,148 B2 | 10/2007 | Tozawa et al. |
| 7,308,702 B1 | 12/2007 | Thomsen et al. |
| 7,313,824 B1 | 12/2007 | Bala et al. |
| 7,319,752 B2 | 1/2008 | Asano et al. |
| 7,380,120 B1 | 5/2008 | Garcia |
| 7,383,586 B2 | 6/2008 | Cross et al. |
| 7,386,529 B2 | 6/2008 | Kiessig et al. |
| 2001/0011254 A1 | 8/2001 | Clark |
| 2001/0021926 A1 | 9/2001 | Schneck et al. |
| 2001/0023421 A1 * | 9/2001 | Numao et al. ................... 707/9 |
| 2001/0032181 A1 * | 10/2001 | Jakstadt et al. ................ 705/40 |
| 2001/0034839 A1 | 10/2001 | Karjoth et al. |
| 2001/0044903 A1 | 11/2001 | Yamamoto et al. |
| 2001/0056550 A1 | 12/2001 | Lee |
| 2002/0010679 A1 | 1/2002 | Felsher |
| 2002/0016922 A1 | 2/2002 | Richards et al. |
| 2002/0031230 A1 | 3/2002 | Sweet et al. |
| 2002/0035624 A1 | 3/2002 | Kim |

| | | |
|---|---|---|
| 2002/0046350 A1 | 4/2002 | Lordemann et al. |
| 2002/0050098 A1 | 5/2002 | Chan |
| 2002/0056042 A1 | 5/2002 | Van Der Kaay et al. |
| 2002/0062240 A1 | 5/2002 | Morinville |
| 2002/0062245 A1 | 5/2002 | Niu et al. |
| 2002/0069077 A1* | 6/2002 | Brophy et al. .................. 705/1 |
| 2002/0069272 A1 | 6/2002 | Kim et al. |
| 2002/0069363 A1 | 6/2002 | Winburn |
| 2002/0073320 A1 | 6/2002 | Rinkevich et al. |
| 2002/0077986 A1 | 6/2002 | Kobata et al. |
| 2002/0077988 A1 | 6/2002 | Sasaki et al. |
| 2002/0087479 A1 | 7/2002 | Malcolm |
| 2002/0099947 A1 | 7/2002 | Evans |
| 2002/0124180 A1 | 9/2002 | Hagman |
| 2002/0129235 A1 | 9/2002 | Okamoto et al. |
| 2002/0133699 A1 | 9/2002 | Pueschel |
| 2002/0138762 A1 | 9/2002 | Horne |
| 2002/0143710 A1 | 10/2002 | Liu |
| 2002/0143906 A1 | 10/2002 | Tormasov et al. |
| 2002/0156726 A1 | 10/2002 | Kleckner et al. |
| 2002/0157016 A1 | 10/2002 | Russell et al. |
| 2002/0169963 A1 | 11/2002 | Seder et al. |
| 2002/0169965 A1 | 11/2002 | Hale et al. |
| 2002/0172367 A1 | 11/2002 | Mulder et al. |
| 2002/0174109 A1 | 11/2002 | Chandy et al. |
| 2002/0176572 A1 | 11/2002 | Ananth |
| 2002/0178271 A1 | 11/2002 | Graham et al. |
| 2002/0194484 A1 | 12/2002 | Bolosky et al. |
| 2002/0198798 A1 | 12/2002 | Ludwig et al. |
| 2003/0009685 A1 | 1/2003 | Choo et al. |
| 2003/0014391 A1 | 1/2003 | Evans et al. |
| 2003/0023559 A1 | 1/2003 | Choi et al. |
| 2003/0028610 A1 | 2/2003 | Pearson |
| 2003/0033528 A1 | 2/2003 | Ozog et al. |
| 2003/0037133 A1 | 2/2003 | Owens |
| 2003/0037237 A1 | 2/2003 | Abgrall et al. |
| 2003/0037253 A1 | 2/2003 | Blank et al. |
| 2003/0046238 A1 | 3/2003 | Nonaka et al. |
| 2003/0051039 A1 | 3/2003 | Brown et al. |
| 2003/0056139 A1 | 3/2003 | Murray et al. |
| 2003/0074580 A1 | 4/2003 | Knouse et al. |
| 2003/0078959 A1* | 4/2003 | Yeung et al. ................. 709/201 |
| 2003/0079175 A1 | 4/2003 | Limantsev |
| 2003/0081784 A1 | 5/2003 | Kallahalla et al. |
| 2003/0081787 A1 | 5/2003 | Kallahalla et al. |
| 2003/0088517 A1 | 5/2003 | Medoff |
| 2003/0088783 A1 | 5/2003 | DiPierro |
| 2003/0110169 A1 | 6/2003 | Zuili |
| 2003/0110266 A1 | 6/2003 | Rollins et al. |
| 2003/0110397 A1 | 6/2003 | Supramaniam |
| 2003/0115146 A1 | 6/2003 | Lee et al. |
| 2003/0115570 A1* | 6/2003 | Bisceglia .................... 717/101 |
| 2003/0120601 A1 | 6/2003 | Ouye |
| 2003/0120684 A1 | 6/2003 | Zuili et al. |
| 2003/0126434 A1 | 7/2003 | Lim et al. |
| 2003/0154381 A1 | 8/2003 | Ouye |
| 2003/0159066 A1 | 8/2003 | Staw et al. |
| 2003/0177070 A1 | 9/2003 | Viswanath et al. |
| 2003/0177378 A1 | 9/2003 | Wittkotter |
| 2003/0182579 A1 | 9/2003 | Leporini et al. |
| 2003/0196096 A1 | 10/2003 | Sutton |
| 2003/0197729 A1 | 10/2003 | Denoue et al. |
| 2003/0200202 A1 | 10/2003 | Hsiao et al. |
| 2003/0217264 A1 | 11/2003 | Martin et al. |
| 2003/0217281 A1 | 11/2003 | Ryan |
| 2003/0217333 A1 | 11/2003 | Smith et al. |
| 2003/0226013 A1 | 12/2003 | Dutertre |
| 2003/0233650 A1 | 12/2003 | Zaner et al. |
| 2004/0022390 A1 | 2/2004 | McDonald et al. |
| 2004/0025037 A1 | 2/2004 | Hair |
| 2004/0039781 A1 | 2/2004 | LaVallee et al. |
| 2004/0064710 A1 | 4/2004 | Vainstein |
| 2004/0068524 A1 | 4/2004 | Aboulhosn et al. |
| 2004/0068664 A1 | 4/2004 | Nachenberg et al. |
| 2004/0073718 A1 | 4/2004 | Johannessen et al. |
| 2004/0088548 A1 | 5/2004 | Smetters et al. |
| 2004/0098580 A1 | 5/2004 | DeTreville |
| 2004/0103202 A1 | 5/2004 | Hildebrand et al. |
| 2004/0103280 A1 | 5/2004 | Balfanz et al. |
| 2004/0133544 A1 | 7/2004 | Kiessig et al. |
| 2004/0158586 A1 | 8/2004 | Tsai |
| 2004/0193602 A1 | 9/2004 | Liu et al. |
| 2004/0193905 A1 | 9/2004 | Lirov et al. |
| 2004/0193912 A1 | 9/2004 | Li et al. |
| 2004/0199514 A1 | 10/2004 | Rosenblatt et al. |
| 2004/0215956 A1 | 10/2004 | Venkatachary et al. |
| 2004/0215962 A1 | 10/2004 | Douceur et al. |
| 2004/0243853 A1 | 12/2004 | Swander et al. |
| 2005/0021467 A1 | 1/2005 | Franzdonk |
| 2005/0021629 A1 | 1/2005 | Cannata et al. |
| 2005/0028006 A1 | 2/2005 | Leser et al. |
| 2005/0039034 A1 | 2/2005 | Doyle et al. |
| 2005/0071275 A1 | 3/2005 | Vainstein et al. |
| 2005/0071657 A1 | 3/2005 | Ryan |
| 2005/0071658 A1 | 3/2005 | Nath et al. |
| 2005/0081029 A1 | 4/2005 | Thornton et al. |
| 2005/0086531 A1 | 4/2005 | Kenrich |
| 2005/0091484 A1 | 4/2005 | Thornton et al. |
| 2005/0120199 A1 | 6/2005 | Carter |
| 2005/0138371 A1 | 6/2005 | Supramaniam |
| 2005/0138383 A1 | 6/2005 | Vainstein |
| 2005/0177716 A1 | 8/2005 | Ginter et al. |
| 2005/0177858 A1 | 8/2005 | Ueda |
| 2005/0198326 A1 | 9/2005 | Schlimmer et al. |
| 2005/0223242 A1 | 10/2005 | Nath |
| 2005/0223414 A1 | 10/2005 | Kenrich et al. |
| 2005/0256909 A1 | 11/2005 | Aboulhosn et al. |
| 2005/0273600 A1 | 12/2005 | Seeman |
| 2005/0283610 A1 | 12/2005 | Serret-Avila et al. |
| 2005/0288961 A1 | 12/2005 | Tabrizi |
| 2006/0005021 A1 | 1/2006 | Torrubia-Saez |
| 2006/0075465 A1 | 4/2006 | Ramanathan et al. |
| 2006/0093150 A1 | 5/2006 | Reddy et al. |
| 2006/0168147 A1 | 7/2006 | Inoue et al. |
| 2006/0230437 A1 | 10/2006 | Boyer et al. |
| 2007/0006214 A1 | 1/2007 | Dubal et al. |

FOREIGN PATENT DOCUMENTS

| | | |
|---|---|---|
| EP | 0 674 253 A1 | 9/1995 |
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 A2 | 6/2001 |
| EP | 1 107 504 B1 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |
| WO | WO 96/41288 A1 | 12/1996 |
| WO | WO 00/56028 A2 | 9/2000 |
| WO | WO 01/61438 A2 | 8/2001 |
| WO | WO 01/63387 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

Yossi Saharon Managing a Windows 2000 Domain with Windows XP Professional Clients Present Feb. 2002 Professor Windows.*

William Stanek Automating Administrative Tasks, Policies, and Procedures Chapter 4, Microsoft Windows 2000 Administrator's Pocket Consultant Jan. 2000 Microsoft Press.*
Paul Thurrott Windows.NET Server 2003 reviewed (Part Two) Dec. 8, 2002 (retrieved from archive.org) Paul Thurrott's SuperSite for Windows.*
Jim Lundy Administering Group Policy with Group Policy Management Console Apr. 2003 Microsoft.*
Michael Cherry Windows.NET Server Reduces Fear of Group Policy Dec. 9, 2002 www.directionsonmicrosoft.com.*
Brien Posey Troubleshoot group policies with Windows XP's Resultant Set of Policy Wizard Nov. 25, 2002 www.zdnetasia.com.*
Alistair G. Lowe-Norris Designing Organization-wide Policies Chapter 9, Windows 2000 Active Directory Jan. 1, 2000 O'Reilly and Associates.*
"Columns" Microsoft TechNet http://web.archive.org/web/20021014225142/www.microsoft.com/technet/columns/default.asp Oct. 14, 2002 Retrieved from web.archive.org on Dec. 3, 2009.*
"Professor Windows—Column Archives" Microsoft TechNet technet.microsoft.com/en-us/library/bb878075.aspx Retrieved on Dec. 3, 2009.*
"WayBack Machine" web.archive.org http://web.archive.org/web/*/http://www.microsoft.com/technet/columns/profwin/ Retrieved on Dec. 3, 2009.*
"Migrating Accounts From Windows NT 4.0 Domains to Windows 2000" Microsoft TechNet—Professor Windows Apr. 2002 http://web.archive.org/web/20020415004611/www.microsoft.com/technet/columns/profwin/ Apr. 15, 2002.*
"Scripting Your Windows 2000 Network, Part 1" Microsoft TechNet—Professor Windows Jun. 2002 Jun. 22, 2002 http://web.archive.org/web/20020622055532/www.microsoft.com/technet/columns/profwin/ Retrieved from web.archive.org on Dec. 3, 2009.*
"eXPeriencing Remote Assistance" Microsoft TechNet—Professor Windows Oct. 2002 Oct. 15, 2002 http://web.archive.org/web/20021015165237/www.microsoft.com/technet/columns/profwin/ Retrieved from web.archive.org on Dec. 3, 2009.*
"Inside Encrypting File System," Part 1, from MSDN Oct. 2001 version, exact publication date is unknown but believed prior to Dec. 12, 2001.
"Inside Encrypting File System," Part 2, from MSDN Oct 2001, version, exact publication date is unknown but believed prior to Dec. 12, 2001.
"Security with Encrypting File System," from MSDN Oct. 2001 version, exact publication date is unknown but believed prior to Dec. 12, 2001.
"How EFS Works," from MSDN Oct. 2001 version, exact publication date is unknown but believed prior to Dec. 12, 2001.
"Encrypting File System," from MSDN Oct. 2001 version, exact publication date is unknown but believed prior to Dec. 12, 2001.
"Feature of EFS," from MSDN Oct. 2001 version, exact publication date is unknown but believed prior to Dec. 12, 2001.
"Windows 2000 EFS," in the Apr. 1999 issue of *Windows NT Magazine*.
Expiration Mechanism for Chipcards, IBM Technical Disclosure Bulletin, Oct. 1, 2001, UK.
McDaniel et al. "Antigone: A Flexible Framework for Secure Group Communication," Proceedings of the 8th USENIX Security Symposium, Aug. 23, 1999.
Stallings, William, "Cryptography and Network Security: Principles and Practice," 1999, pp. 333-337, Second Edition, Prentice Hall, Upper Saddle River, New Jersey.
"Affect," The American Heritage Dictionary of the English Language, Fourth Edition, Houghton Mifflin Company, 2002. Retrieved May 4, 2006 from http://dictionary.reference.com/search?q=affect.
Microsoft Windows 200 server. Windows 2000 Group Policy White Paper, 2000.
Symantec. Norton Antivirus Corporate Edition Implementation Guide, 1999.
Crocker, Steven Toye, "Multi-level cryptographic transformations for securing digital assets," U.S. Appl. No. 10/404,566, filed Mar. 31, 2003.
Crocker, Steven Toye, "Effectuating access policy changes to designated places for secured files," U.S. Appl. No. 10/259,075, filed Sep. 27, 2002.
Kenrich, Michael Frederick, "Multi-Level File Digest", U.S. Appl. No. 10/894,493, filed Jul. 19, 2004.
Kinghorn, Gary Mark, "Method and system for-protecting electronic data in enterprise environment," U.S. Appl. No. 10/159,220, filed May 31, 2002.
Nath, Satyajit, "Method and system for securing digital assets using content type designations," U.S. Appl. No. 10/405,587, filed Apr. 1, 2003.
Prakash, Nalini J., "Method and apparatus for securing/unsecuring files by file crawling," U.S. Appl. No. 10/325,102, filed Dec. 20, 2002.
Rossmann, Alain, "Hybrid systems for securing digital assets," U.S. Appl. No. 10/325,013, filed Dec. 20, 2002.
A Real-Time Push-Pull Communications Model for Distributed Real-Time and Multimedia Systems, Jan. 1999, School of Computer Sciences Carnegie Mellon University, Kanaka Juvva, Raj Rajkumar.
U.S. Appl. No. 10/889,685, entitled "Method and Apparatus for Controlling the Speed Ranges of a Machine" inventor Thomas, Jul. 13, 2004, 18 pgs.
U.S. Appl. No. 10/028,397, entitled "Method and system for restricting use of a clipboard application," inventor Zuili, Dec. 21, 2001, 38 pgs.
U.S. Appl. No. 10/368,277, entitled "Method and apparatus for uniquely identifying files," inventor Ouye, Feb. 18, 2003, 25 pgs.
U.S. Appl. No. 10/286,524, entitled "Security system that uses indirect password-based encryption," inventor Gumik, Nov. 1, 2002, 38 pgs.
U.S. Appl. No. 10/242,185, entitled "Method and system for protecting encrypted files transmitted over a network" inventor Ryan, Sep. 11, 2002, 33 pgs.
U.S. Appl. No. 10/642,041, entitled "Method and system for fault-tolerant transfer of files across a netwok" inventor Kenrich, Aug. 15, 2003, 32 pgs.
U.S. Appl. No. 10/610,832, entitled "Method and system for enabling users of a group shared across multiple file security systems to access secured files" inventor Ryan, Jun. 30, 2003, 33 pgs.
U.S. Appl. No. 10/448,806, entitled "Method and System for Using Remote Headers to Secure Electronic Files" inventor Ryan, May 30, 2003, 35 pgs.
U.S. Appl. No. 10/074,194, entitled "Methods for identifying compounds that inhibit or reduce PTP1B expressions" inventor Rondinone, Feb. 12, 2002, 69 pgs.
U.S. Appl. No. 10/074,804, entitled "Secured Data Format for Access Control," inventor Garcia, Feb. 12, 2002, 108 pgs.
U.S. Appl. No. 10/075,194, entitled "System and Method for Providing Multilocation Access Management to Secured Items," inventor Vainstein et al., Feb. 12, 2002, 110 pgs.
U.S. Appl. No. 10/074,996, entitled "Method and Apparatus for Securing Electronic Data," inventor Lee et al., Feb. 12, 2002, 111 pgs.
U.S. Appl. No. 10/074,825, entitled "Method and Apparatus for Accessing Secured Electronic Data Off-line," inventor Lee et al., Feb. 12, 2002, 108 pgs.
U.S. Appl. No. 10/105,532, entitled "System and Method for Providing Different Levels of Key Security for Controlling Access to Secured Items," inventor Hildebrand et al., Mar. 20, 2002, 86 pgs.
U.S. Appl. No. 10/186,203, entitled "Method and System for Implementing Changes to Security Policies in a Distributed Security System," inventor Huang, Jun. 26, 2002, 65 pgs.
U.S. Appl. No. 10/201,756, entitled "Managing Secured Files in Designated Locations," inventor Alain, Jul. 22, 2002, 121 pgs.
U.S. Appl. No. 10/206,737, entitled "Method and System for Updating Keys in a Distributed Security System," inventor Hildebrand, Jul. 26, 2002, 60 pgs.
U.S. Appl. No. 10/246,079, entitled "Security System for Generating Keys from Access rules in a Decentralized Manner and Methods Therefor," inventor Hildebrand, Sep. 17, 2002, 78 pgs.
U.S. Appl. No. 10/259,075, entitled "Effectuating Access Policy Changes to Designated Places for Secured Files," inventor Crocker, Sep. 27, 2002, 60 pgs.

U.S. Appl. No. 10/286,575, entitled "Method and Architecture for Providing Access to Secured Data from Non-Secured Clients," inventor Vainstein, Nov. 1, 2002, 46 pgs.

U.S. Appl. No. 10/295,363, entitled "Security System Using Indirect Key Generation from Access Rules and Methods Therefor," inventor Vainstein, Nov. 15, 2002, 70 pgs.

U.S. Appl. No. 11/889,310, entitled "Methods and Systems for Providing Access Control to Electronic Data," inventor Rossmann, Aug. 10, 2007, 90 pgs.

U.S. Appl. No. 11/797,367, entitled "Method and System for Managing Security Tiers," inventor Vainstein, May 2, 2007, 11 pgs.

Adobe Acrobat 5.0 Classroom in a Book, Adobe Press, Jun. 26, 2001, pp. 1-4.

Adobe Acrobat Security Settings, Acrobat 7.0, Nov. 15, 2004, pp. 1-4.

"Security Options". Dec. 20, 2001. DC & Co. pp. 1-2.

Search Report, completion date May 8, 2003, for European Patent Application No. EP 02 25 8530, 2 pages.

Search Report, completion date Oct. 2, 2003, for European Patent Application No. EP 02 25 8531, 2 pages.

Search Report, completion date Apr. 14, 2005, for European Patent Application No. EP 02 25 8533, 2 pages.

Search Report, completion date Mar. 16, 2005, for European Patent Application No. EP 02 25 8534, 2 pages.

Search Report, completion date Mar. 2, 2005, for European Patent Application No. EP 02 25 8535, 2 pages.

Search Report, completion date Mar. 3, 2005, for European Patent Application No. EP 02 25 8537, 2 pages.

Search Report, completion date May 12, 2005, for European Patent Application No. EP 02 25 8539, 2 pages.

Search Report, completion date Jul. 6, 2005, for European Patent Application No. EP 02 25 8529, 4 pages.

Search Report, completion date Oct. 8, 2003, for European Patent Application No. EP 02 25 8536, 2 pages.

Search Report, completion date May 8, 2003, for European Patent Application No. EP 02 25 8540, 2 pages.

Examination Report, completion date Jun. 18, 2008, for European Patent Application No. EP 02 258 532.7-1244, 6 pgs.

Boneh et al., "Hierarchical Identity Based Encryption with Constant Size Ciphertext," Advances in Cryptology- EUROCRYPT 2005, vol. 3493, Jun. 20, 2005, pp. 440-456.

Boneh et al., "IBE Secure E-mail," Stanford University, Apr. 8, 2002, http://crypto.stanford.edu/ibe/.

* cited by examiner

SECURITY SYSTEM WITH STAGING CAPABILITIES

CROSS-REFERENCE TO RELATED APPLICATION

This application is related to: (i) U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes; (ii) U.S. application Ser. No. 10/186,203, filed Jun. 26, 2002, and entitled "METHOD AND SYSTEM FOR IMPLEMENTING CHANGES TO SECURITY POLICIES IN A DISTRIBUTED SECURITY SYSTEM," which is hereby incorporated by reference for all purposes; and (iii) U.S. application Ser. No. 10/206,737, filed Jul. 26, 2002, and entitled "METHOD AND SYSTEM FOR UPDATING KEYS IN A DISTRIBUTED SECURITY SYSTEM," which is hereby incorporated by reference for all purposes.

BACKGROUND OF THE INVENTION

1. Field of the Invention

The present invention relates to security systems for data and, more particularly, to security systems that protect data in an inter/intra enterprise environment.

2. Description of Related Art

As organizations become more dependent on networks for business transactions, data sharing and everyday communications, their networks have to be increasingly accessible to customers, employees, suppliers, partners, contractors and telecommuters. Unfortunately, as the accessibility increases, so does the exposure of critical data that is stored on the network. Hackers can threaten all kinds of valuable corporate information resources including intellectual property (e.g., trade secrets, software code and competitive data), sensitive employee information (e.g., payroll figures and HR records), and classified information (e.g., passwords, databases, customer records, product information and financial data).

In protecting the proprietary information traveling across networks, one or more cryptographic techniques are often used to secure a private communication session between two communicating computers on the network. Cryptographic techniques provide a way to transmit information across an unsecure communication channel without disclosing the contents of the information to anyone who may be eavesdropping on the communication channel. An encryption process is a cryptographic technique whereby one party can protect the contents of data in transit from access by an unauthorized third party, yet the intended party can read the data using a corresponding decryption process.

Many organizations have deployed firewalls, Virtual Private Networks (VPNs) and Intrusion Detection Systems (IDS) to provide protection. Unfortunately, these various security means have been proven insufficient to reliably protect proprietary information residing on internal networks.

Even when security systems are available to protect electronic data, such systems need to be able to implement changes to the system as passwords, restrictions or criteria change. However, when using conventional approaches to implement changes to security systems, the impact or effectiveness of these changes to the security systems are often unknown or difficult to predict. The danger in making changes when the impact is unknown is that the changes can unexpectedly result in unintended consequences or system failure, resulting in scenarios in which authorized users are no longer able to access electronic data they should be able to access, and/or unauthorized users are incorrectly able to access electronic data they should not be able to access. Further, it would be difficult to return the security system to its state prior to the changes.

Thus, there is a need for improved ways to implement changes to a security system.

SUMMARY OF THE INVENTION

The present invention relates to an improved system and method for providing a security system with the capability to stage a modification to its operation before actually modifying normal operation of the security system. If the staging of the modification to the security system is deemed successful, the modification can be fully deployed with reduced risk of unexpected security lapses or other detrimental consequences.

The present invention may be used in many types of security systems. These security systems operate to secure electronic data, such as files (e.g., files pertaining to documents). The invention can be implemented in numerous ways, including as a method, system, device, and computer readable medium. Several embodiments of the invention are discussed below.

As a method for altering access information of a security system, one embodiment of the invention includes at least the acts of: forming stage access information for staging with respect to the security system, the stage access information being based on active access information in use by the security system; altering the stage access information to modify the behavior of the security system while staging; testing the behavior of the security system while staging by operating in accordance with the altered stage access information; and thereafter deploying the altered stage access information so as to replace the active access information.

As a method for facilitating staging of alterations to access limitations of a security system, one embodiment of the invention includes at least the acts of: receiving a login request to a staging server from a user; determining whether the user is authorized to utilize the staging server; denying the login request when the user is not authorized to utilize the staging server; initializing the staging server with initial stage access limitations derived from active access limitations; modifying the initial stage access limitations to provide a staged environment; verifying operation of the security system in the staged environment while utilizing the modified stage access limitations; and deploying the staged environment as an active environment of the security system.

As a security system for restricting access to secured electronic documents associated with an entity, one embodiment of the invention includes at least: an active server that provides an active environment that enforces security on the secured electronic documents in accordance with organizational information of the entity and active document access information; a staging server that provides a staging environment to test security imposed on the secured electronic documents in accordance with the organizational information of the entity and stage document access information; and a database including at least the organizational information of the entity for use by both the active server and the staging server, the active document access information for use by the active server, and the stage document access information for use by the staging server.

As a computer readable medium including at least computer program code for altering access information of a security system, one embodiment of the invention includes at least: computer program code for forming stage access information for staging with respect to the security system, the stage access information being based on active access information in use by the security system; computer program code for altering the stage access information to modify the behavior of the security system while staging; and computer program code for thereafter deploying the altered stage access information so as to replace the active access information.

As a computer readable medium including at least computer program code for facilitating staging of alterations to access limitations of a security system, one embodiment of the invention includes at least: computer program code for receiving a login request to a staging server from a user; computer program code for determining whether the user is authorized to utilize the staging server; computer program code for denying the login request when the user is not authorized to utilize the staging server; computer program code for initializing the staging server with initial stage access limitations derived from active access limitations; computer program code for modifying the initial stage access limitations to provide a staged environment; computer program code for verifying operation of the security system in the staged environment while utilizing the modified stage access limitations; and computer program code for deploying the staged environment as an active environment of the security system.

As a computer readable medium including at least computer program code for altering access information of a security system, the security system operates to restrict access to secured electronic data based on the access information, one embodiment of the invention includes at least: computer program code for obtaining stage access information for staging with respect to the security system; and computer program code for deploying the stage access information to be used as the access information for normal operational use of the security system in restricting access to the secured electronic data.

Other objects, features, and advantages of the present invention will become apparent upon examining the following detailed description of an embodiment thereof, taken in conjunction with the attached drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
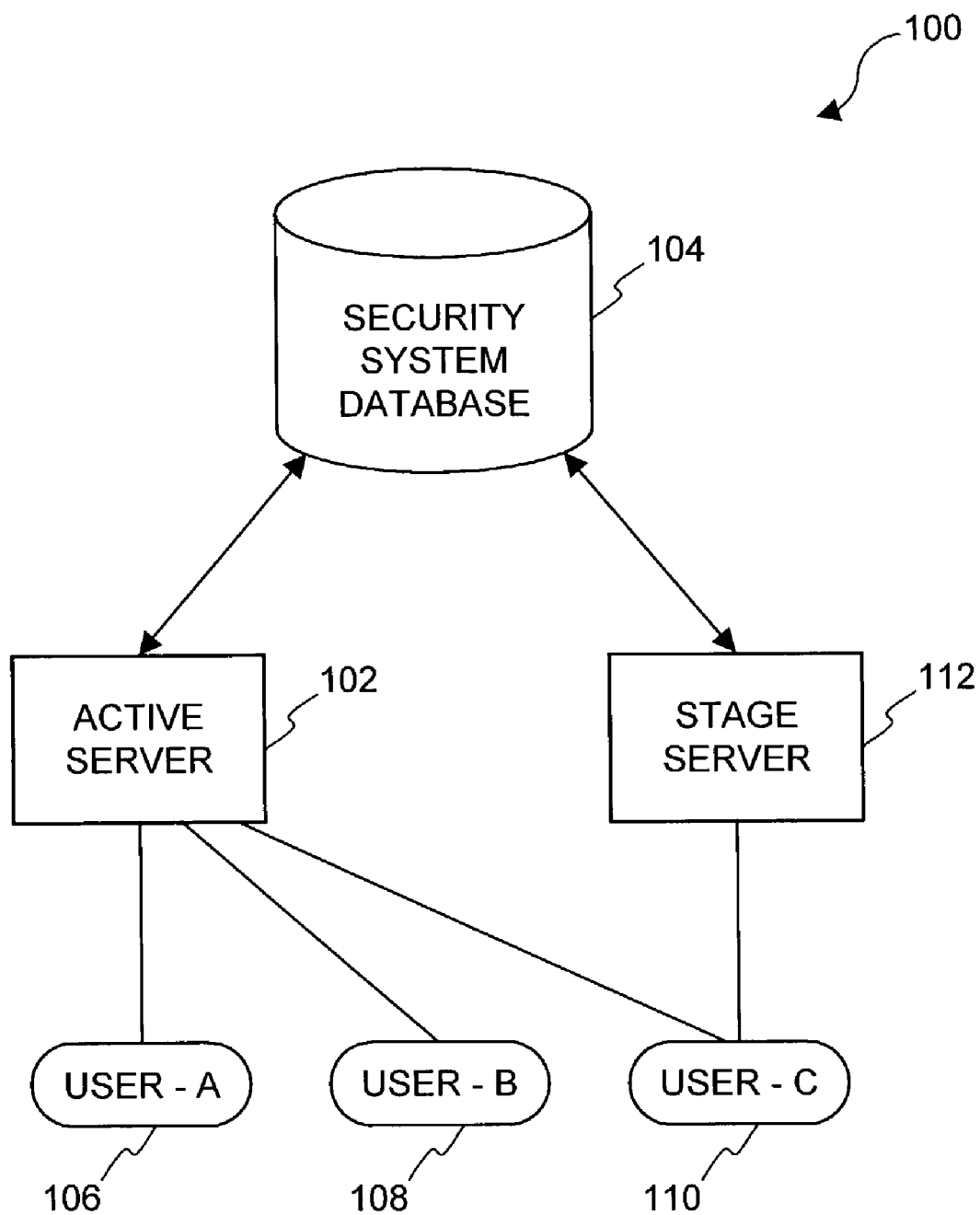
FIG. 1 is a security system according to one embodiment of the invention.

The present invention relates to an improved system and method for providing a security system with the capability to stage a modification to its operation before actually modifying normal operation of the security system. If the staging of the modification to the security system is deemed successful, the modification can be fully deployed with reduced risk of unexpected security lapses or other detrimental consequences.

The present invention may be used in many types of data systems, including security systems. These security systems operate to secure electronic data, such as files (e.g., files containing documents). To facilitate the description of the present invention, unless specifically stated, a security system or a file security system are interchangeably used herein. A file security system (or document security system) serves to limit access to files (documents) only to authorized users. Often, an organization, such as a company, would use a file security system to limit access to its files (documents). For example, users of a group might be able to access files (documents) pertaining to the group, whereas other users not within the group would not be able to access such files (documents). Such access, when permitted, would allow a user of the group to retrieve a copy of a file (document) pertaining to the group via a data network.

Secured files are files that require one or more keys, passwords, access privileges, etc. to gain access to their content. In one embodiment, the security is provided through encryption and access rules. Access data (such as keys and access privileges) can be stored in one or more data stores of a server, and distributed by the server to certain users (e.g., users who belong to appropriate groups). The files, for example, can pertain to documents, multimedia files, data, executable code, images and text. In general, a secured file can only be accessed by authenticated users with appropriate access rights or privileges. In one embodiment, each secured file is provided with a header portion and a data portion, where the header portion contains or points to security information. The header portion may contain security constraints that are to be processed in conjunction with the access data distributed by the server. The security information is used to determine whether access to associated data portions of secured files is permitted.

As used herein, a user may mean a human user, a software agent, a group of users, a member of a group of users, a device and/or application. Beside a human user who needs to access a secured document, a software application or agent sometimes needs to access secured files in order to proceed. Accordingly, unless specifically stated, the "user" as used herein does not necessarily pertain to a human being.

In the following description, numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-5E. However, those skilled in the art will readily appreciate that the detailed description given herein with respect to these figures is for explanatory purposes as the invention extends beyond these limited embodiments.

FIG. 1 is a security system 100 according to one embodiment of the invention. The security system 100 supports an active environment and a staging environment. The active environment is the normal operating environment for the security system 100. The staging environment is a logically separate environment that can be used to test or stage the impact of changes to the security system before actually implementing such changes in the active environment.

The security system 100 includes an active server 102 and a security system database 104. Together the active server 102 and the security system database 104 provide the core of the security system 100. The active server 102 operates to restrict access to secured files (e.g., documents) such that only authorized users are able to gain access. In doing so, the active server 102 performs processing to authenticate users and, possibly in conjunction with client software, verify their privileges and/or rights with respect to secured files. In managing the security of the secured files, the active server 102 interacts with the security system database 104 that stores security information. The security information governs whether, where and/or when users or groups of users are able to gain access to the secured files.

The security system 100 allows users 106, 108 and 110 to gain access to secured files via the active server 102. The secured files can be stored in a variety of different locations, such as at a user's computing device, the active server 102, the security system database 104, or some other storage area accessible by the active server 102. When one of the users 106, 108 and 110 attempts to access a secured file (after having successfully logged into the active server 102), the active server 102 evaluates whether the requesting user satisfies the policies and rules associated with accessing the secured file as are identified within the security system database 104.

In addition, the security system 100 is configured to permit staging such that changes to the security information utilized by the security system can be tested to verify integrity of the security system with such changes prior to being fully deployed. In this regard, the staging environment allows a system administrator (e.g., user 110) to interact with a stage server 112 to alter the security information stored within the security system database 104 for the purposes of providing a staging environment. However, the presence or use of the staging environment does not invalidate, alter, or make inaccessible, the active security environment. If the system administrator is satisfied with the security provided by the security system in the staging environment, then the system administrator can elect to deploy the staged environment such that the staged environment becomes the active environment of the security system. In one implementation, the system administrator would not be permitted to simultaneously log into the active server 102 and the stage server 112, so as to avoid accidental alteration of the security information in the security system database 104.

According to one embodiment, the security information stored in the security system database 104 includes organizational information as well as document access information. More generally, the document access information can be considered file access information. However, in the embodiments discussed below, the files are primarily documents; hence, the phrase document access information is used. In one embodiment, the organizational information includes information on users or groups of users, and the document access information includes information on rights and/or privileges for accessing particular documents.

Figure 2A:
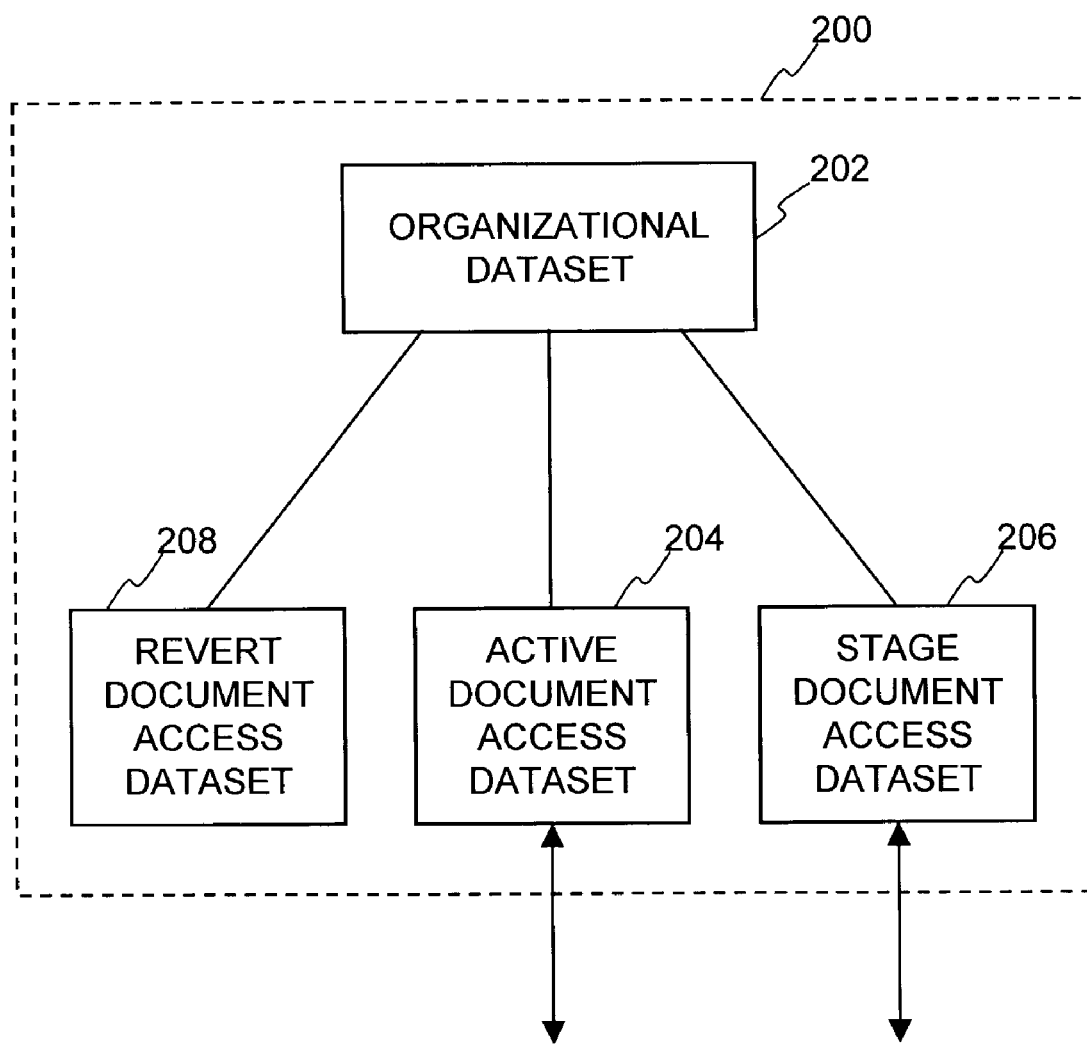
FIGS. 2A-2C are block diagrams of security information stored within a security system database according to several embodiments of the invention.

FIG. 2A illustrates a block diagram of security information 200 stored within a security system database according to one embodiment of the invention. The security system database storing the security information 200 can, for example, be the security system database 104 illustrated in FIG. 1.

The security information 200 includes organizational dataset 202, active document access dataset 204, stage document access dataset 206, and revert document access dataset 208. The organizational dataset 202 provides information pertaining to an entity that is affiliated with the security system. In other words, typically, the security system is provided for a particular entity (e.g., company) and access rights to secured documents associated with the entity are arranged to be in accordance with the organizational dataset 202. For example, the organizational dataset 202 can identify a plurality of different groups of users, which can change as users are promoted, demoted, transferred within the company, hired or fired. In addition, the security information 200 stores document access information which pertains to access policies and/or rules associated with particular secured documents. The document access dataset is provided in three logically separate areas of the security system database 200. The three separate areas that contain the document access dataset respectively include the active document access dataset 204, the stage document access dataset 206, and the revert document access dataset 208. Although these different types of document access information are logically distinct and outwardly separate, they can reside in or share the same database tables of the security information 200. In any case, the organizational dataset 202 is common across the different types of document access information (active, stage and revert). The datasets 204, 206, and 208 are all synchronized with the dataset 202, as explained below with respect to FIGS. 5A-5E. Hence, the organizational dataset 202 is thus utilized regardless of whether the security system is operating in an active environment or a staged environment. The revert document access dataset 208 is meant to backup the active document access dataset 204. Namely, when the active document access dataset 204 is overwritten with the stage document access dataset 206, the revert copy of the active document access dataset (i.e., the revert document access dataset 208) affords restore of the old active document access dataset (provided the old active document access dataset was concomitantly and atomically copied to one of the revert document access datasets). Hence, the revert document access dataset 208 is never used directly.

Figure 2B:
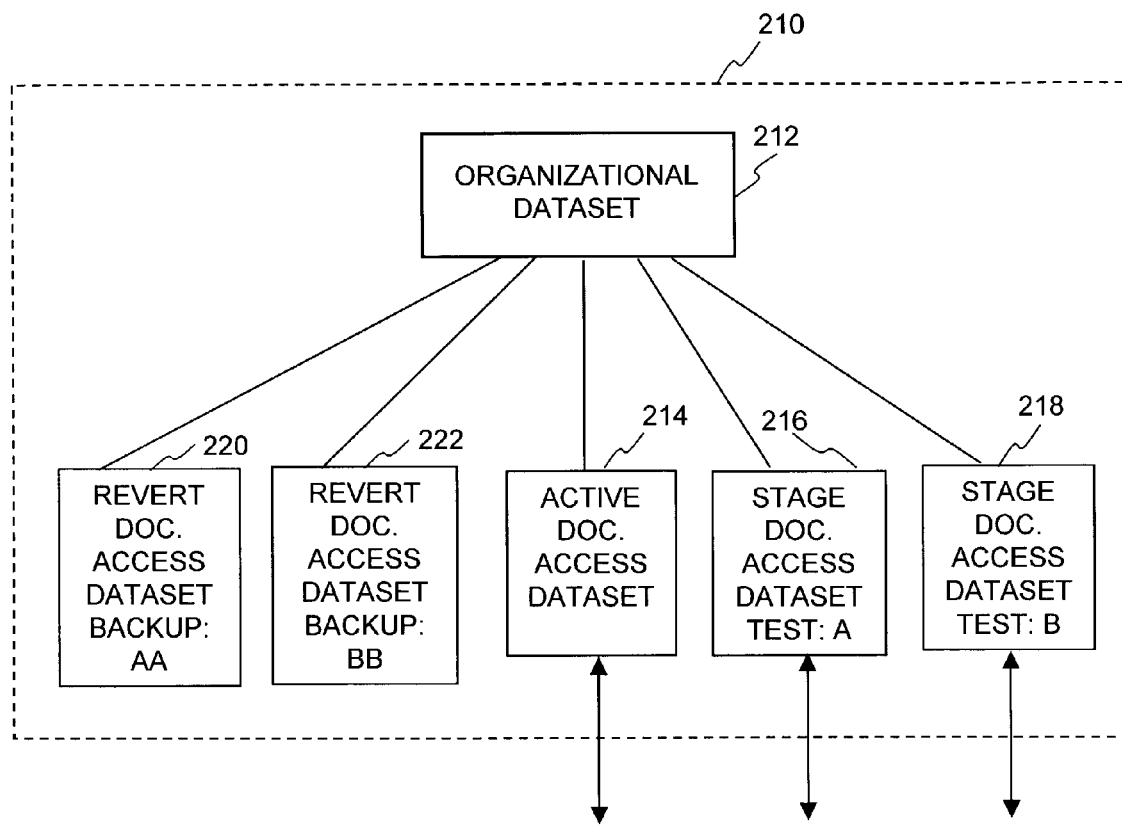

FIG. 2B illustrates a block diagram of security information 210 stored within a security system database according to another embodiment of the invention. The security system database storing the security information 210 can, for example, be the security system database 104 illustrated in FIG. 1.

The security information 210 includes organizational dataset 212, active document access dataset 214, multiple stage document access datasets 216 and 218, and multiple revert document access datasets 220 and 222. There is only one active document access dataset 214. The organizational dataset 212 provides information pertaining to an entity that is affiliated with the security system. In other words, typically, the security system is provided for a particular entity (e.g., company) and access rights to secured documents associated with the entity are arranged to be in accordance with the organizational dataset 212. For example, the organizational dataset 212 can identify a plurality of different groups of users, which can change as users are promoted, demoted, transferred within the company, hired or fired. In addition, the security information 210 stores document access information which pertains to access policies and/or rules associated with particular secured documents. The document access information is provided in three logically separate areas of the security information 210. The three separate areas that contain the document access information respectively include the active document access dataset 214, the stage document access datasets 216 and 218, and the revert document access datasets 220 and 222. Although these different types of document access information are logically distinct and outwardly separate, they can reside in or share the same database tables of the security system database 210. In any case, the organizational dataset 212 is common across the different types of document access information (active, stage and revert). The datasets 214, 216, 218, 220, 222 and 208 are all synchronized with the dataset 212, as explained below with respect to FIGS. 5A-5E. Hence, the organizational dataset 212 is utilized regardless of whether the security system is operating in an active environment or a staged environment. The revert document access datasets 220 and 222 are meant to backup the active document access dataset 214. Namely, when the active document access dataset 214 is overwritten with the stage document access dataset, the revert copies of the active document access dataset (e.g., revert document access datasets 220 or 222) afford restore of the old active document access dataset (provided the old active document access dataset was concomitantly and atomically copied to one of the revert document access datasets). Hence, the revert document access datasets 220 and 222 are never used directly.

The multiple stage document access datasets allow for simultaneous staging and testing of different security scenarios. For example, users may be assigned to stage test groups, with each of the users being responsible for testing one stage document access dataset.

Multiple revert document access datasets allow for multiple full backups. One revert document access dataset may be copied to another revert document access dataset. The active document access dataset may be copied to a revert document access dataset without the concomitant copying of a stage document access dataset to the active document access dataset (this could be useful if changes are made directly to the active document access dataset, which procedure is possible although not recommended). Other additional operations not possible with the embodiment discussed above in connection with FIG. 2A may be afforded.

Figure 2C:
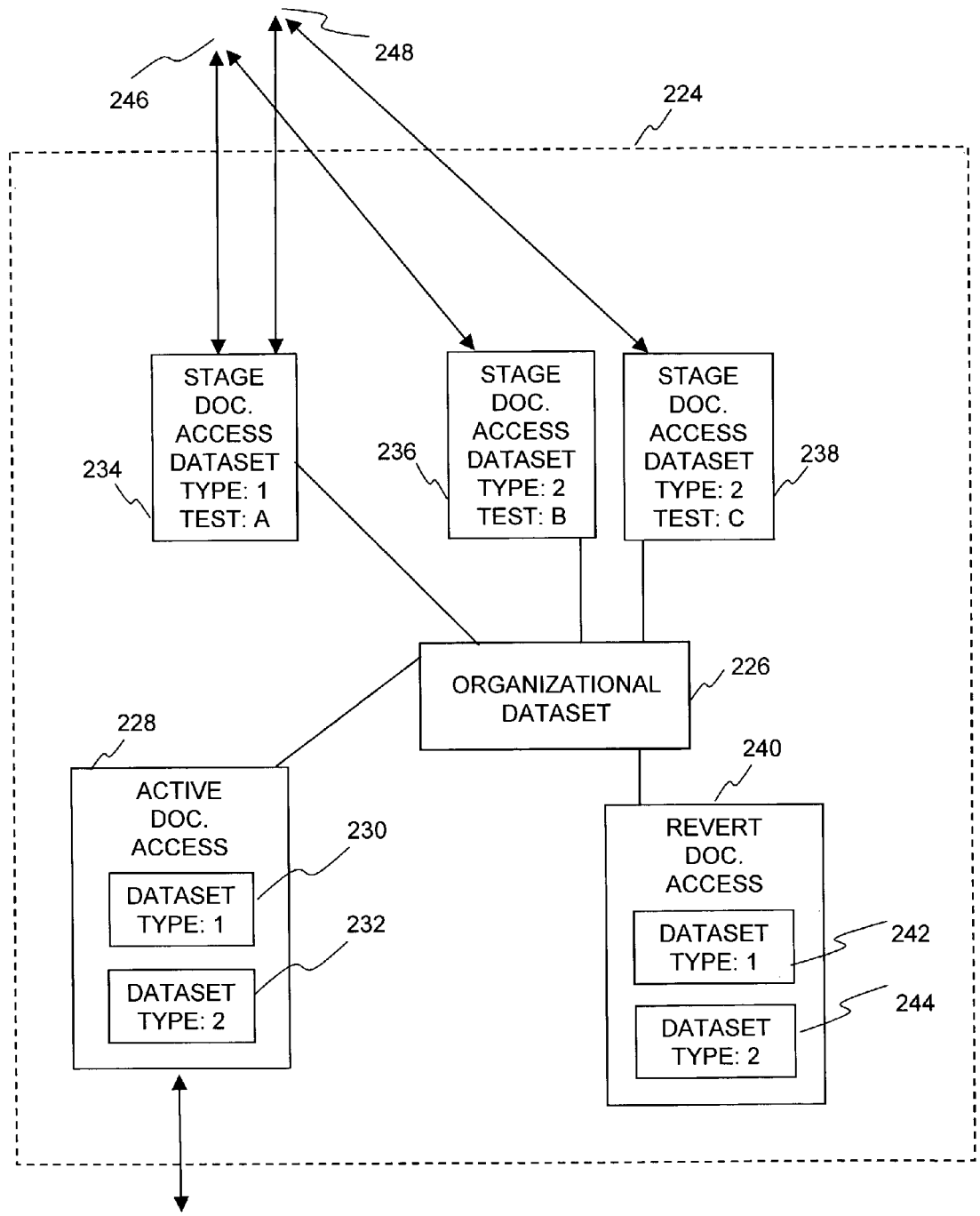

FIG. 2C illustrates a block diagram of security information 224 stored within a security system database according to yet another embodiment of the invention. The security system database storing the security information 224 can, for example, be the security system database 104 illustrated in FIG. 1.

The security information 224 includes organizational dataset 226, active document access dataset 228, stage document access dataset, and revert document access dataset 240. In this embodiment, the document access datasets has multiple types, namely, Type 1 and Type 2. Type 1 could be centrally-mandated folders, and Type 2 could be access policies. The active document access dataset 228 has a Type 1 dataset 230 and a Type 2 dataset 232. There is only one such combined active document access dataset. The revert document access dataset 240 has a Type 1 dataset 242 and a Type 2 dataset 244. There can be many such combined revert document access datasets, as in the embodiment specified above in FIG. 2B. The organizational dataset 226 provides information pertaining to an entity that is affiliated with the security system. In other words, typically, the security system is provided for a particular entity (e.g., company) and access rights to secured documents associated with the entity are arranged to be in accordance with organizational dataset 226. For example, the organizational dataset 226 can identify a plurality of different groups of users, which can change as users are promoted, demoted, transferred within the company, hired or fired. In addition, the document access information pertains to access policies and/or rules associated with particular secured documents. The document access information is provided in three logically separate areas of the security information 224. The three separate areas that contain the document access information respectively include the active document access dataset 228, the stage document access datasets 234, 236 and 238, and the revert document access dataset 240. Although these different types of document access information are logically distinct and outwardly separate, they can reside in or share the same database tables of the security information 224. In any case, the organizational dataset 226 is common across the different types of document access information (active, stage and revert). The datasets 230, 232, 234, 236, 238, 242 and 244 are all synchronized with the organizational dataset 226, as explained below in FIGS. 5A-5E. Hence, the organizational dataset 226 is utilized regardless of whether the security system is operating in an active environment or a staged environment. The revert document access datasets 242 and 244 are meant to backup the active document access datasets 230 and 232. For example, when the active document access dataset is overwritten with a stage document access dataset, a revert copy of the active document access dataset affords restore of the old active document access dataset. Hence, the revert document access datasets are never used directly.

This embodiment affords the testing of different combinations of staging document access datasets, each combination being comprised of one staging document access dataset per document access dataset type. Two such representative combinations 246 and 248 are shown in FIG. 2C. Users may be assigned to stage test groups, each responsible for testing of one stage document access dataset combination.

This embodiment further affords revert document access datasets to be combinations of staging document access datasets, each combination being comprised of one staging document access dataset per document access dataset type. This allows flexible backup of staging combinations. Other additional operations not possible with the embodiments discussed above in connection with FIGS. 2A-2B may be afforded.

Figure 3:
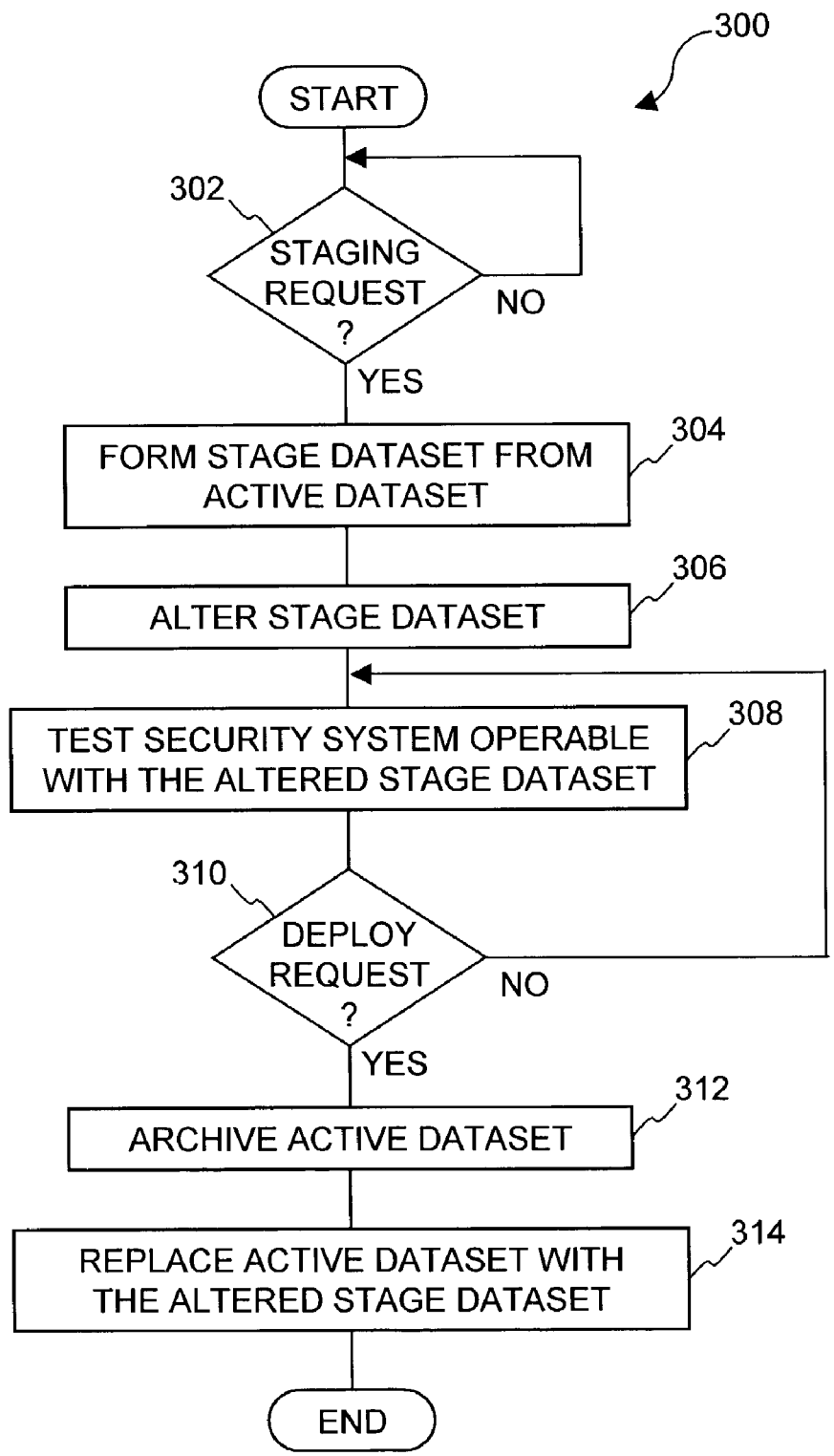
FIG. 3 is a flow diagram of staging and deploying processing according to one embodiment of the invention.

FIG. 3 is a flow diagram of staging and deploying processing 300 according to one embodiment of the invention. The staging and deploying processing 300 is, for example, performed by a security system, such as the security system 100 illustrated in FIG. 1.

The staging and deploying processing 300 begins with a decision 302 that determines whether a staging request has been received. When the decision 302 determines that a staging request has not yet been received, the staging and deploying processing 300 awaits such a request. In other words, the staging and deploying processing 300 can be considered to be invoked once the staging request has been received.

In any case, once the decision 302 determines that a staging request has been received, a stage dataset is formed 304 from the active dataset. The active dataset is associated with an active environment of the security system under which the security system normally operates. A stage dataset is a separate dataset that is utilized in a staging environment to stage or test a different implementation of the security system due to differences between the stage dataset and the active dataset. For example, the stage dataset can be one of the multiple stage datasets (or possibly dataset combinations) available in a security system data store such as shown in FIGS. 2A-2C. When the stage dataset is formed 304, it is normally the same or similar (at least initially) to the active dataset because, in at least one embodiment, it is derived from the active dataset. Next, the staged dataset is altered 306. Here, the staged dataset is altered 306 such that the staging environment is provided by the alteration. Normally, such alteration would be initiated by a system administrator of the security system. At least one embodiment prevents a system administrator from altering both the active dataset and a stage dataset in the course of a single login, to minimize mistakes.

Next, the security system operates in accordance with the altered stage dataset to test 308 the security system in the staged environment. Here, the testing is typically initiated and performed by a user (e.g., system administrator) through interaction with the security system. A decision 310 then determines whether a deploy request has been received. The deploy request is typically a request provided by the system administrator that instructs the security system to deploy the staging environment such that it becomes the active environment. In other words, when the testing of the security system in accordance with the altered stage data set has proven to be successful, a system administrator can issue a deploy request. Alternatively, the system administrator could be unsatisfied with the test 308 of the security system and thus choose to not deploy the staging environment of the security system; an administrator could then order testing resumed, further alter the stage dataset and then order testing started afresh, or start over by sending another staging request to be processed. Here, in the embodiment shown in FIG. 3, it is assumed that the system administrator was at some point satisfied with the test 308 of the security system. Hence, when the decision 310 determines that a deploy request has not yet been received, the staging and deploying processing 300 awaits such a request. Once the decision 310 determines that a deploy request has been received, the staging environment is deployed such that it becomes the active environment. More particularly, in deploying the staging environment, the active dataset is archived 312. The archived version of the active dataset is also known as a revert dataset. By archiving the active dataset, the active dataset is able to be subsequently retrieved in the case in which the security system is to be reverted back to the prior active dataset. After the active data set has been archived 312, the active dataset is replaced 314 with the altered stage dataset. In effect, the replacement 310 of the active dataset with the altered stage dataset operates to deploy the staging environment to the active environment. The operations 312 and 314 are typically contained in an atomic transaction. Following the operation 314, the staging and deploying processing 300 is complete and ends.

Figure 4A:
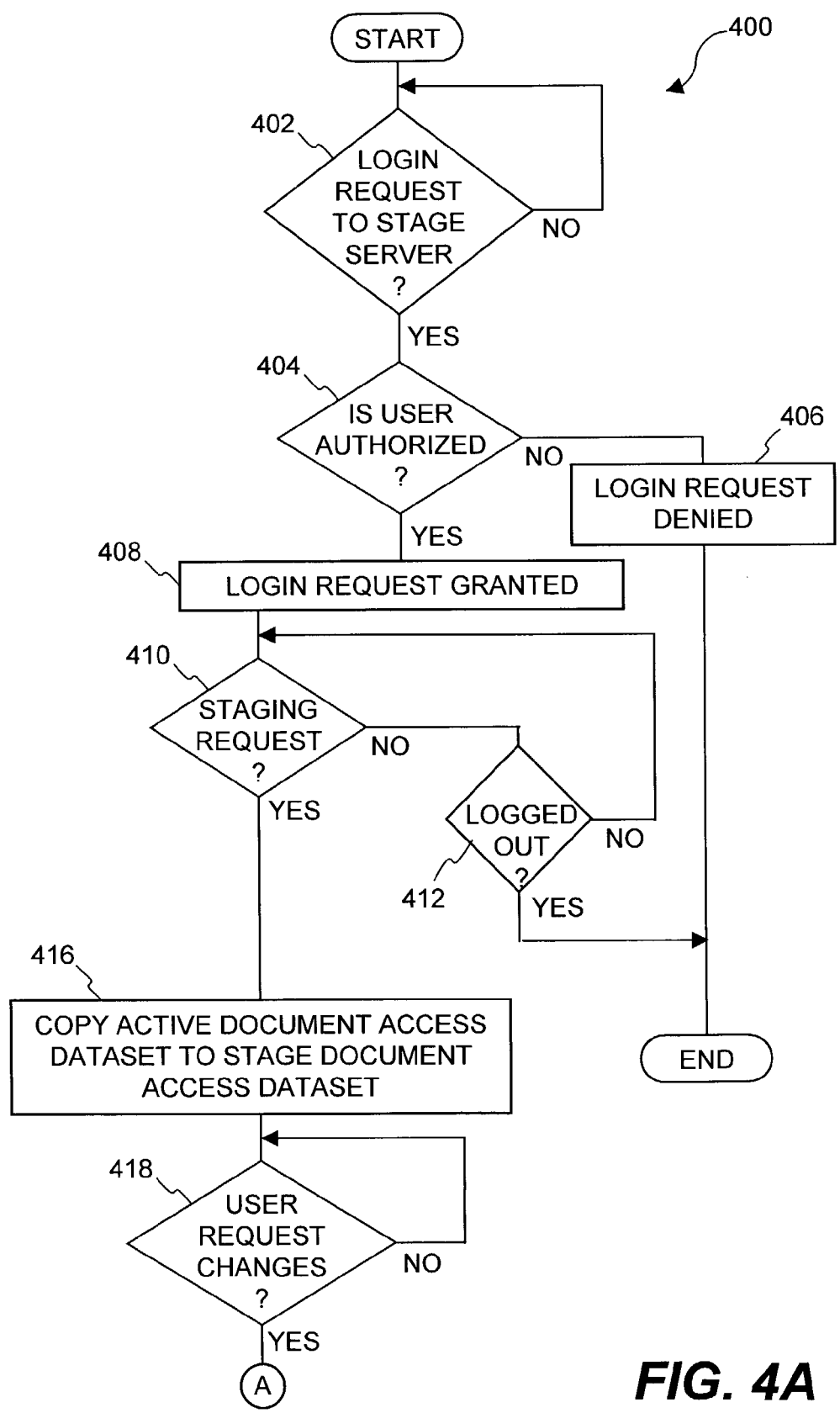
FIGS. 4A and 4B are flow diagrams of staging and deploying processing according to another embodiment of the invention.
Figure 4B:
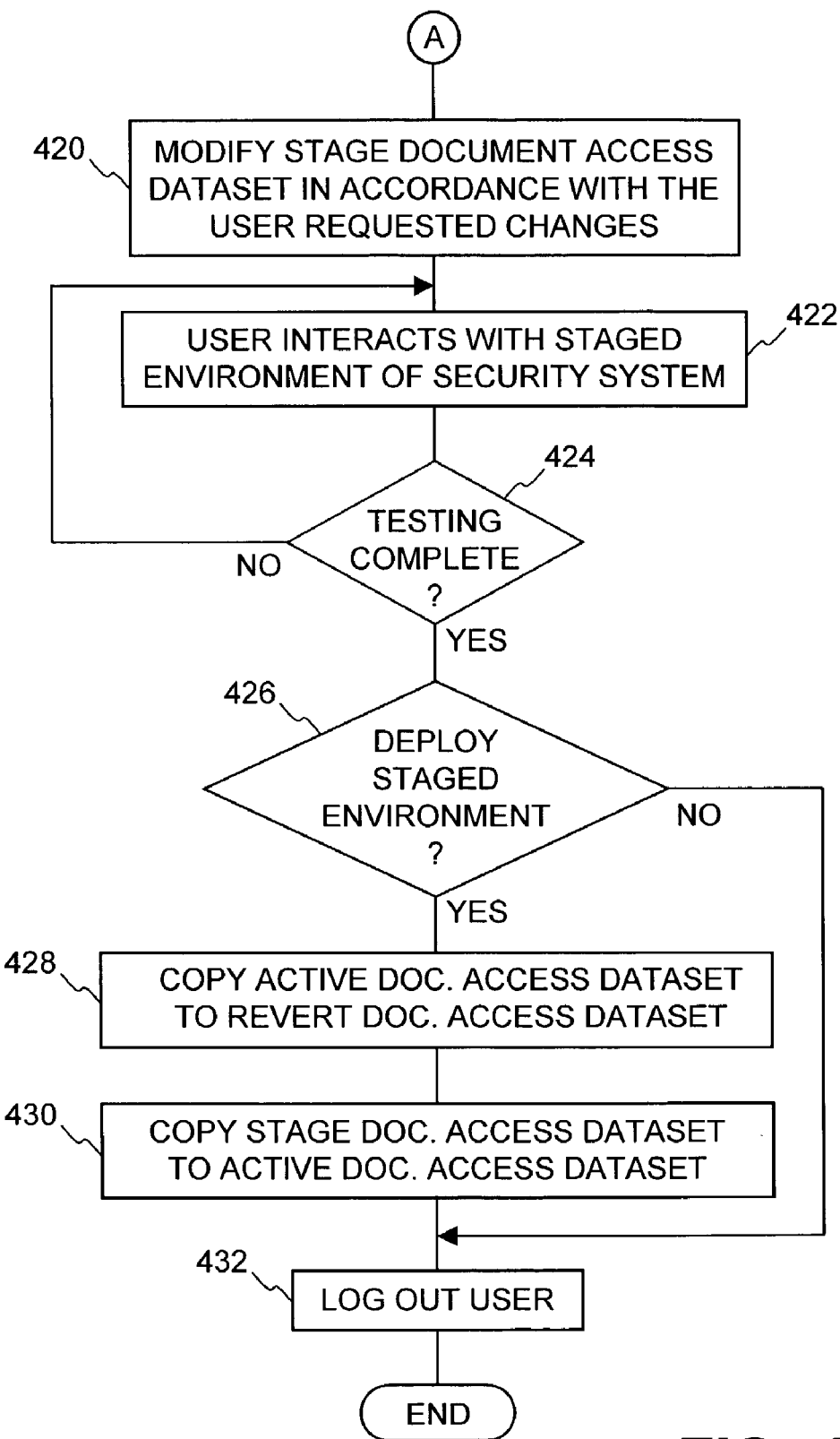

FIGS. 4A and 4B are flow diagrams of staging and deploying processing 400 according to one embodiment of the invention. The staging and deploying processing 400 is, for example, performed by a security system, such as the security system 100 illustrated in FIG. 1.

The staging and deploying processing 400 begins with a decision 402 that determines whether a login request to a stage server has been received. When the decision 402 determines that a login request has not yet been received, the staging and deploying processing 400 awaits such a request. In effect, the staging and deploying processing 400 can be considered to be invoked once a login request has been received.

Once the decision 402 determines that a login request to the stage server has been received, a decision 404 determines whether the user is authorized. The user that is making the login request is typically a staging administrator for the security system, which is a particular type of system administrator that has authorization to perform staging operations. When the decision 404 determines that the user is not authorized, then the login request is denied 406. In at least one embodiment, decision 404 also determines the stage dataset or dataset combination that the user making login request desires to access.

On the other hand, when the decision 404 determines that the user is authorized, then the login request is granted 408. At this point, the user is logged into the stage server and can thus perform staging operations. In one implementation, the user would not be permitted to be simultaneously logged into the active server, so as to avoid accidental alteration of active data. Next, a decision 410 determines whether a staging request has been received. The staging request is a particular request to initiate staging (or to invoke staging operations). When the decision 410 determines that a staging request has not yet been received, a decision 412 determines whether the user has been logged out. When the decision 412 determines that the user should be logged out, then the user is logged out from the stage server. Hence, following the operations 406 and 414, the staging and deploying processing 400 ends with no staging having been performed.

Alternatively, when the decision 412 determines that the user has not logged out, then the staging and deploying processing 400 returns to repeat the decision 410 to await the receipt of a staging request. Once the decision 410 determines that a staging request has been received, active document access dataset is copied 416 to a stage document access dataset. For example, as shown in FIGS. 2A-2C, the active document access dataset is a body of data within the security system database that is separate from the stage document access dataset. According to one embodiment, the document access dataset can include rules and/or policies that govern access to documents. Often, any preexisting stage document dataset would be deleted before the active document access dataset is copied 416 over to become the stage document access dataset.

Next, a decision 418 determines whether user-requested changes to the stage document access dataset have been received. When the decision 418 determines that user-requested changes have not yet been received, the staging and deploying processing 400 typically awaits such requested changes. However, it should be noted that the processing could time-out or otherwise end if no user-requested changes are received. When the decision 418 determines that user-requested changes have been received, then the stage document access dataset is modified 420 in accordance with the user requested changes. Thereafter, the user interacts 422 with the staged environment of the security system to test its operability and robustness. The staged environment of the security system that is provided is through use of the modified stage document access dataset. Next, a decision 424 determines whether testing of the staged environment has completed. When the user (staging administrator) determines that the staged environment has not yet been sufficiently tested, then the staging and deploying processing 400 can return to repeat the operation 422 and subsequent operations.

On the other hand, when the user (staging administrator) determines that testing of the staged environment is complete, then a decision 426 determines whether the staged environment is to be deployed. When the decision 426 determines that the staged environment is to be deployed, then the active document access dataset is copied 428 to revert document access dataset. For example, as shown in FIG. 2A, the revert document access dataset can be a separate body of information within the security system database. Next, the stage document access dataset is copied 430 to the active document access dataset. In effect, operations 428 and 430 operate to first archive the current active document access dataset and then replace the current active document access dataset with the staged document access dataset which then becomes the new current active document access dataset, thereby deploying the previously staged environment. The operations 428 and 430 are typically contained in an atomic transaction. Alternatively, when the decision 426 determines that the staged environment is not to be deployed, the operations 428 and 430 are bypassed. Following the operation 430 or its being bypassed, the user is logged out 432 from the stage server. After the user is logged out 432, the staging and deploying processing 400 ends.

The document access information stored within the security system database can include information on rules and/or policies. These rules and/or policies are typically stored within the security system database as tables. More generally, other data objects can be considered document access data and included in document access information (e.g., document access datasets). Although the discussion below refers primarily to rules, the principles apply to other data objects as well.

FIGS. 5A-5E illustrate a series of different versions of a relational rules table according to one embodiment of the invention. The rules table shown in FIGS. 5A-5E is an exemplary portion of the document access information that might be stored within a security system database in the context of a rule. In general, a rule is a condition for document access that must be satisfied in order for a requestor to gain access to the corresponding document. Hence, if a document requires the satisfaction of a particular rule, then the rule must be satisfied before the requestor is permitted to gain access to the corresponding document.

Figure 5A:
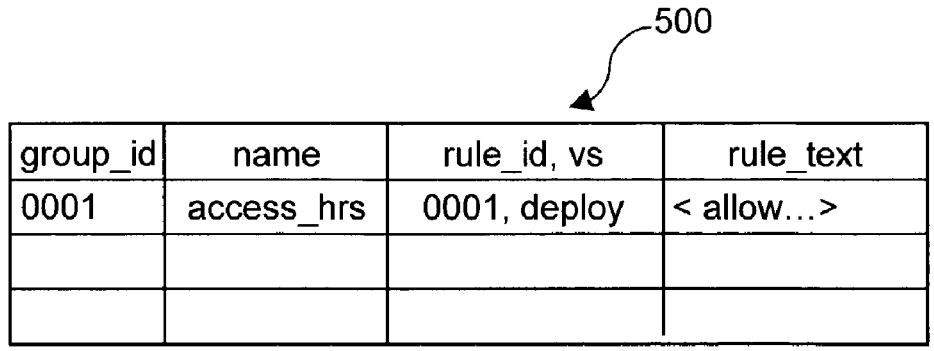
FIGS. 5A-5E illustrate a series of different versions of a rules table according to one embodiment of the invention.

As shown in rules table 500 of FIG. 5A, a rule is identified by rule identifier (rule_id) "0001", is named "access_hrs" and is for use with the "deploy" version space (version_space or vs). The "deploy" version space corresponds to the active document access dataset 204 illustrated in FIG. 2A. In one embodiment, a unique identifier being utilized is a composite key including a rule identifier and a version space (rule_id, version_space). The rule itself is defined by rule criteria (rule_text) provided within the rules table 500 as "<allow . . . >".

Figure 5B:
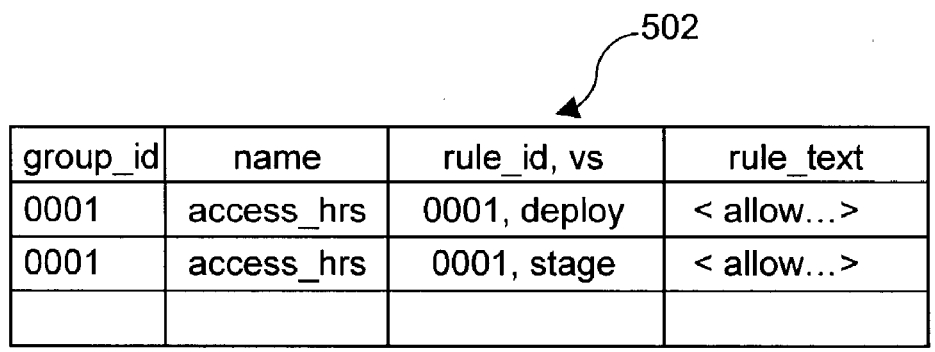

When staging is initiated, the rule identified by the rule identifier "0001" will be copied from the "deploy" version space to the "stage" version space, where the "stage" version space corresponds to the stage document access dataset 206 illustrated in FIG. 2A, for example. Hence, as shown in FIG. 5B, rules table 502 is updated as compared to the rules table 500 shown in FIG. 5A. Namely, the rules table 502 includes a new entry identified by the composite key provided by the rule identifier (rule_id) "0001" and the version space "stage". At this point, the new entry pertains to the same rule as the rule identified by the rule identifier "0001" and version pace "active", and thus has the same name (access_hrs) and rule criteria (rule_text). However, the composite key for the two entries in the rules table 502 are different between these two rule instances. More particularly, the first entry in the rules table 502 is still affiliated with the "deploy" version space, whereas the second entry in the rules table 502 is affiliated with the "stage" version space.

Figure 5C:
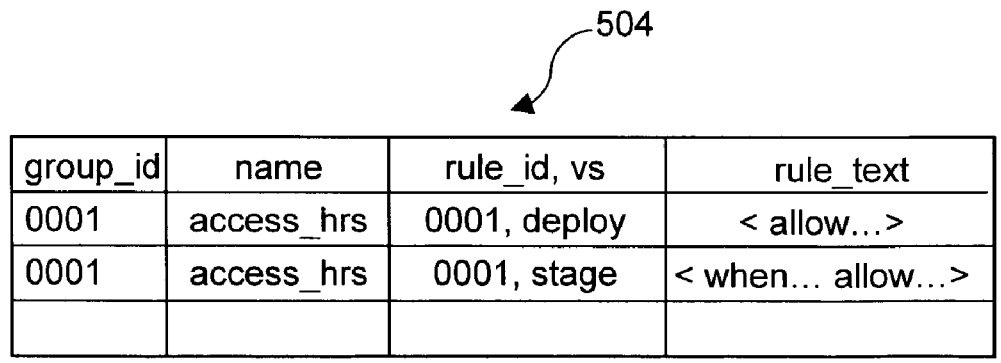

Next, to implement a distinct staging environment, the system administrator interacts with the security system to alter the rule uniquely identified by the rule identifier "0001" and the version space "stage". Hence, as shown in FIG. 5C, the second entry of rules table 504 indicates that the rule text (rule_text) has been altered for purposes of the staged environment. At this point, the system administrator can utilize the stage environment to test whether or not the modified rule having the rule identifier "0001" and the version space "stage" is sufficiently successful to be deployed. When the staged environment is to be deployed, a two-step process can be utilized. The first step is shown in FIG. 5D, and the second step is shown in FIG. 5E.

Figure 5D:
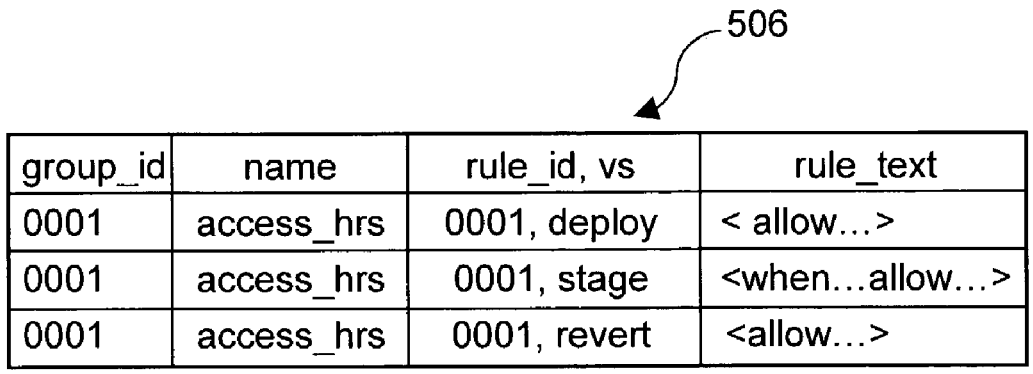
Figure 5E:
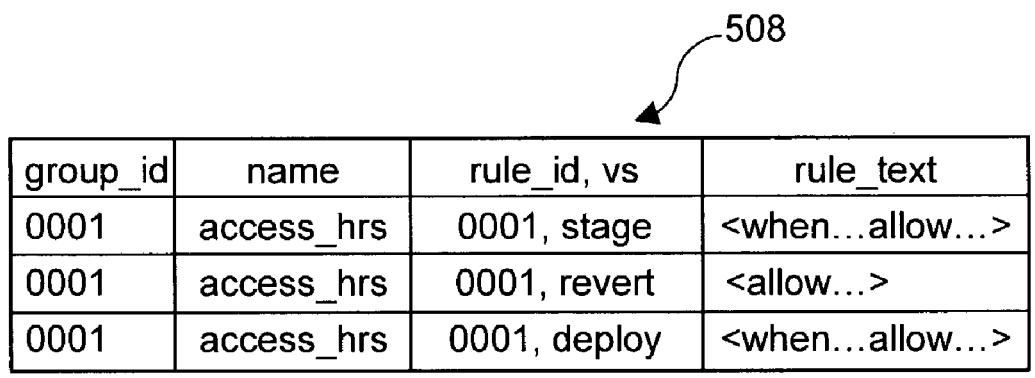

The version of rules table 506 shown in FIG. 5D includes the same two entries as in FIG. 5C, with the addition of a third entry uniquely identified by the rule identifier "0001" and the version space "revert". The third entry in the rules table 506 represents a copy of the rule associated with the "deploy" version space (i.e., the first entry, namely, the rule pertaining to the rule identifier "0001" and the version space "deploy"). Hence, the rule identified by the third entry is essentially a copy of the rule identified by the first entry with the differences being the different rule identifiers and the different version spaces. The "revert" version space is, for example, associated with the revert document access dataset 208 illustrated in FIG. 2A.

After the third entry has been provided in the rules table 506 for the "revert" version space as shown in FIG. 5D, the rule from the "stage" version space is copied to the "deploy" version space. As shown in FIG. 5E, rules table 508 is now updated such that the previous first entry is deleted and a new first entry is provided for the "deploy" version space which is added. Note that although the rule identifier and version spaces differ between the first and third entries in the rules table 508, the names and the rule text for the rules are the same.

The versions of the relational rules tables 500, 502, 504, 506 and 508 shown in FIGS. 5A-5E also include a group identifier (group_id). The group identifier defines a rule's relationship with some particular group of users. The relationship can be defined through any other deterministic relational or non-relational mapping.

In one embodiment, group objects are part of the organizational dataset (e.g., organizational dataset shown in FIGS. 2A-C). The other datasets (e.g., active, stage and revert datasets) are synchronized with the organizational dataset. Specifically, when a group is deleted in the organizational dataset, all other dataset records referencing that group are also deleted. In this way, revert, stage and active datasets never include an invalid rule (i.e., a rule that requires membership in a deleted group). According to one embodiment, when a rule references multiple groups and one of those groups is deleted, the rule is automatically edited by the security system to exclude reference to the deleted group, instead of deleting the entire rule. Hence, each rule can reference one or more groups. Although the rules tables shown in FIGS. 5A-5E reference a single group identified by group identifier "0001", the entries in the rules tables can reference more than one group.

According to one embodiment, the security system can perform an operation to merge groups A and B into group C, and can then cause rules associated with groups A and B to become re-associated with group C. Further, the security system can also perform an operation to split group C into groups A and B, and can then cause rules associated with group C to become re-associated with both groups A and B.

In another embodiment, the security system can provide for permanent and semi-permanent groups. In such an embodiment, rules can only be associated with the permanent groups and not the semi-permanent groups. Such would guarantee that as long as no permanent groups were deleted since the active document access dataset was copied to a particular revert document access dataset, the particular revert document access dataset would have a superior degree of validity.

Additional details on a security system can be found in (i) U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes; (ii) U.S. application Ser. No. 10/186,203, filed Jun. 26, 2002, and entitled "METHOD AND SYSTEM FOR IMPLEMENTING CHANGES TO SECURITY POLICIES IN A DISTRIBUTED SECURITY SYSTEM," which is hereby incorporated by reference for all purposes; and (iii) U.S. application Ser. No. 10/206,737, filed Jul. 26, 2002, and entitled "METHOD AND SYSTEM FOR UPDATING KEYS IN A DISTRIBUTED SECURITY SYSTEM," which is hereby incorporated by reference for all purposes.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include tangible media such as read-only memory, random-access memory, CD-ROMs, DVDs, magnetic tape, and optical data storage devices. The tangible computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that changes to a security system can be staged before deployment. Another advantage of the invention is that merge conflicts between different access data can be minimized or managed. Still another advantage of the invention is that organizational data can be common while access data can be different for staging and deployment.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method comprising:
    forming access information for staging with respect to a security system, wherein the security system operates to restrict access to secured electronic data based on access information, wherein the access information includes or references one or more of access rules or access policies including at least when and where the secured electronic data can be accessed by a plurality of users, wherein the access information is based on active access information currently in use by the security system, and wherein the active access information and the access information is stored in a database operatively connected to the security system;
    forming altered access information to modify the behavior of the security system during the staging;
    testing the behavior of the security system during the staging by operating the security system in accordance with the altered access information; and
    deploying the altered access information so as to synchronize the active access information stored in the database with the altered access information.

2. The method as recited in claim 1, wherein the security system thereafter operates in the manner as previously staged.

3. The method as recited in claim 1, wherein forming altered access information comprises modifying at least one of the access rules or at least one of the access policies of the access information to produce the altered access information.

4. The method as recited in claim 1, wherein forming access information for staging is configured by a user, and
    wherein forming altered access information is performed in accordance with input provided by the user.

5. The method as recited in claim 1, wherein forming access information for staging is configured by a user, and
    wherein the testing of the behavior of the security system is performed in accordance with input provided by the user.

6. The method as recited in claim 1, wherein forming access information for staging comprises copying the active access information to the access information.

7. The method as recited in claim 1, wherein the deploying of the altered access information comprises:
    archiving the active access information in use by the security system; and
    replacing the active access information with the altered access information.

8. The method as recited in claim 7,
    wherein forming altered access information comprises modifying at least one of the access rules or at least one of the access policies of the access information to produce the altered access information.

9. A method comprising:
    initializing a staging server with initial access limitations derived from active access limitations, wherein a security system operates to restrict access to secured electronic data based on the access limitations, the access limitations including at least when and where the secured electronic data can be accessed by one or more user groups, and wherein the active access limitations are stored in a database operatively connected to the security system;
    modifying the initial access limitations to provide a staged environment;
    verifying operation of the security system in the staged environment while utilizing the modified access limitations; and
    deploying the staged environment as an active environment of the security system so as to synchronize the active access limitations stored in the database with the modified access limitations.

10. The method as recited in claim 9, wherein the security system includes an active server for normal operation and the staging server for staging changes to the security system.

11. The method as recited in claim 10, wherein the active environment is provided through use of the active access limitations and the active server of the security system.

12. The method as recited in claim 9, wherein the initializing comprises copying the active access limitations to the initial access limitations.

13. The method as recited in claim 9, wherein the modifying of the initial access limitations is performed in accordance with selections from a user.

14. The method as recited in claim 9, wherein the deploying comprises:
   replacing the access limitations of the security system with the modified access limitations.

15. The method as recited in claim 9, wherein the deploying comprises:
   archiving the access limitations of the security system; and
   replacing the access limitations of the security system with the modified access limitations.

16. The method as recited in claim 9, wherein the active access limitations include or reference one or more of access rules or access policies.

17. The method as recited in claim 16, wherein the initial access limitations include or reference one or more of access rules or access policies.

18. A system comprising:
   an active server configured to enforce access limitations regarding secured electronic documents in accordance with organizational information of an entity and active document access information, wherein the active document access information includes or references one or more of access rules or access policies including at least when and where the secured electronic documents can be accessed by one or more user groups;
   a staging server configured to test access limitations imposed on the secured electronic documents in accordance with the organizational information of the entity and document access information, wherein the document access information includes or references one or more of access rules or access policies including at least when and where the secured electronic documents can be accessed by the one or more user groups; and
   a database stored in a computer readable storage medium, wherein the database is operatively connected to the active server and the staging server, wherein the database includes at least the organizational information of the entity synchronized for use by both the active server and the staging server, the active document access information for use by the active server, and the document access information for use by the staging server.

19. The system as recited in claim 18, wherein a plurality of users in the one or more user groups can interact with the active server to access the secured electronic documents, and wherein an authorized administrator of the security system can interact with the staging server to test the staging environment prior to deploying the staging environment as the active environment by synchronizing the document access information stored in the database with the access information for use by the staging server.

20. The system as recited in claim 19, wherein the document access information is derived from the active document access information.

21. The system as recited in claim 18, wherein the database further includes at least revert document access information for storing at least one prior version of the active document access information.

22. The system as recited in claim 21, wherein at least one of the active document access information and the revert document access information are configured to include at least a plurality of partitions, each of the partitions pertaining to a different type of document access information.

23. The system as recited in claim 22, wherein the document access information is derived from a selection of at least one partition from the active document access information and at least one partition from the revert document access information.

24. The system as recited in claim 22, wherein each of the active document access information, the document access information and the revert document access information includes or references one or more of access rules or access policies.

25. A non-transitory computer readable storage medium having instructions stored thereon, the instructions comprising:
   instructions to form access information for staging with respect to a security system, wherein the security system operates to restrict access to secured electronic data based on access information, and wherein the access information is based on active access information in use by the security system, wherein the access information includes or references one or more of access rules or access policies including at least when and where the secured electronic data can be accessed by a plurality of users, and wherein the active access information is stored in a database operatively connected to the security system;
   instructions to alter the access information to modify the behavior of the security system during the staging; and
   instructions to deploy the altered access information so as to synchronize the active access information stored in the database with the altered access information.

26. The non-transitory computer readable storage medium as recited in claim 25, wherein:
   the security system thereafter operates in the manner as previously staged; and
   the instructions to alter comprises modifying at least one of the access rules or at least one of the access policies of the access information to produce the altered access information.

27. The non-transitory computer readable storage medium as recited in claim 25, wherein the instructions further comprise:
   instructions to test the behavior of the security system during the staging by operating the security system in accordance with the altered access information.

28. A non-transitory computer readable storage medium having instructions stored thereon, the instructions comprising:
   initializing a staging server with initial access limitations derived from active access limitations, wherein a security system operates to restrict access to secured electronic data based on the access limitations, wherein the access limitations include or reference one or more of access rules or access policies including at least when and where the secured electronic data can be accessed by one or more users or user groups, and wherein the active access limitations are stored in a database operatively connected to the security system;
   instructions for modifying the initial access limitations to provide a staged environment;
   instructions for verifying operation of the security system in the staged environment while utilizing the modified access limitations; and
   instructions for deploying-the staged environment as an active environment of the security system so as to synchronize the active access limitations stored in the database with the modified access limitations.

29. The non-transitory computer readable storage medium as recited in claim 28, wherein the deploying comprises:

archiving the access limitations of the security system; and replacing the access limitations of the security system with the modified access limitations.

30. A non-transitory computer readable storage medium having instructions stored thereon, the instructions comprising:

instructions to obtain access information for staging with respect to a security system, wherein the security system operates to restrict access to secured electronic data based on access information, and wherein the access information includes or references one or more of access rules or access policies including at least when and where the secured electronic data can be accessed by a plurality of users, and wherein the active access is stored in a database operatively connected to the security system;

testing the behavior of the security system during the staging by operating the security system in accordance with the access information;

instructions to alter the access information to modify the behavior of the security system during the staging; and instructions to deploy the access information to be used as the access information for normal operational use of the security system in restricting access to the secured electronic data so as to synchronize the active access information stored in the database with the altered access information.

\* \* \* \* \*

UNITED STATES PATENT AND TRADEMARK OFFICE
CERTIFICATE OF CORRECTION

| | | |
|---|---|---|
| PATENT NO. | : 7,890,990 B1 | Page 1 of 1 |
| APPLICATION NO. | : 10/327320 | |
| DATED | : February 15, 2011 | |
| INVENTOR(S) | : Vainstein et al. | |

It is certified that error appears in the above-identified patent and that said Letters Patent is hereby corrected as shown below:

On Title Page 5, item (56), under "Other Publications", in Column 1, Line 50, delete ""Feature" and insert -- "Features --.

On Title Page 5, item (56), under "Other Publications", in Column 2, Line 35, delete "netwok"" and insert -- network" --.

On Title Page 6, item (56), under "Other Publications", in Column 2, Line 18, delete "Ciphertcxt,"" and insert -- Ciphertext," --.

Column 16, line 64, in Claim 28, delete "deploying-the" and insert -- deploying the --.

Signed and Sealed this
Twenty-eighth Day of June, 2011

David J. Kappos
*Director of the United States Patent and Trademark Office*